(12) United States Patent
Cho et al.

(10) Patent No.: US 9,196,156 B2
(45) Date of Patent: Nov. 24, 2015

(54) ELECTRONIC APPARATUS AND METHOD OF RECEIVING INFORMATION, AND RECORDING MEDIUM FOR RECORDING PROGRAM EXECUTING METHOD OF RECEIVING INFORMATION

(75) Inventors: Changbin Cho, Gwangmyung-si (KR); Jinyoung Kim, Seoul (KR); Haeil Lee, Seoul (KR); Seungwan Woo, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 127 days.

(21) Appl. No.: 14/001,571

(22) PCT Filed: Feb. 24, 2012

(86) PCT No.: PCT/KR2012/001417
§ 371 (c)(1),
(2), (4) Date: Nov. 1, 2013

(87) PCT Pub. No.: WO2012/115477
PCT Pub. Date: Aug. 30, 2012

(65) Prior Publication Data
US 2014/0046580 A1    Feb. 13, 2014

(30) Foreign Application Priority Data
Feb. 25, 2011    (KR) .................. 10-2011-0017184

(51) Int. Cl.
| G06F 19/00 | (2011.01) |
| G08G 1/00 | (2006.01) |
| G06F 3/01 | (2006.01) |
| G01C 21/36 | (2006.01) |
| G08G 1/0967 | (2006.01) |
| G08G 1/0968 | (2006.01) |

(52) U.S. Cl.
CPC .............. *G08G 1/00* (2013.01); *G01C 21/3691* (2013.01); *G06F 3/017* (2013.01); *G08G 1/096741* (2013.01); *G08G 1/096775* (2013.01); *G08G 1/096838* (2013.01); *G08G 1/096844* (2013.01); *G08G 1/20* (2013.01)

(58) Field of Classification Search
None
See application file for complete search history.

(56) References Cited

U.S. PATENT DOCUMENTS

| 8,661,369 | B2* | 2/2014 | Heo et al. ................. 715/864 |
| 2012/0030634 | A1* | 2/2012 | Miyazaki .................. 715/863 |
| 2013/0147711 | A1* | 6/2013 | Njolstad et al. ........... 345/158 |
| 2014/0298224 | A1* | 10/2014 | Arita et al. ................ 715/765 |
| 2015/0026825 | A1* | 1/2015 | Dube et al. ................ 726/28 |

FOREIGN PATENT DOCUMENTS

| JP | 2006-322782 | 11/2006 |
| JP | 2008-304324 | 12/2008 |
| KR | 10-2005-0108393 | 11/2005 |
| KR | 10-0920017 | 10/2009 |

* cited by examiner

*Primary Examiner* — Adam Alharbi
(74) *Attorney, Agent, or Firm* — Fox Rothschild LLP

(57) ABSTRACT

The present invention relates to an electronic apparatus and method for receiving various pieces of information, after setting various search conditions, based on the set search conditions. According to the present invention, the electronic apparatus comprises: a communication unit; and in the case that a particular event occurs, a control unit transmitting search conditions including at least one of a search direction, search range and search region, related to the event through the communication unit, and receiving information corresponding to the search conditions.

17 Claims, 21 Drawing Sheets

ELECTRONIC APPARATUS AND METHOD OF RECEIVING INFORMATION, AND RECORDING MEDIUM FOR RECORDING PROGRAM EXECUTING METHOD OF RECEIVING INFORMATION

CROSS REFERENCE TO RELATED APPLICATION

This application is the national phase under 35 USC 371 of international application no. PCT/KR2012/001417, filed Feb. 24, 2012, which claims the benefit of the priority date of Korean application no. 10-2011-0017184, filed Feb. 25, 2011. The contents of the aforementioned applications are incorporated herein in their entirety.

TECHNICAL FIELD

The present invention relates to an electronic apparatus and a method thereof that configure a search condition and receive information based on the configured search condition.

More particularly, the present invention relates to an electronic apparatus and a method thereof that receive information which conforms with a search condition based on a search condition including location information in information acquired/collected by a plurality of terminals (alternatively, a plurality of users) through a social network.

BACKGROUND ART

As an Internet network is opened and a law associated with location information is established, an industry of a location based service (LBS) is activated. As one of the location based service, a navigation industry that measures a current location of a terminal and furthermore, determines and guides a movement route up a destination is rapidly activated. As a result, a research into a navigation terminal is actively conducted.

Moreover, a wireless Internet communication environment is constructed, and as various information can be easily accessed through various wireless communication type terminals at any time and anywhere, various researches into a method that is capable of collecting and using information more rapidly and more excitedly haven been conducted.

Even in a field of the navigation terminal, a research into various methods for providing real-time traffic information has been already conducted, but because most of the information is information after a predetermined time is delayed or traffic information on an undesired region should be received together, there is a problem in rapidity of information transmission and reception or efficiency of information transmission and reception.

DETAILED DESCRIPTION OF THE INVENTION

Technical Problem

A technical object of the preset invention is to provide an electronic apparatus and a method thereof that configures a search condition including at least one of a search direction and a search range, and a search location to receive information which conforms to the configured search condition, at the time of receiving various information collected through a network.

Another technical object of the present invention is to provide an electronic apparatus and a method thereof that can provide a user interface through which a user can facilitate an input for configuring a search condition.

Technical Solution

According to one aspect of the present invention, there is provided an electronic apparatus, including: a communication unit; and a control unit transmitting, when a specific event occurs, a search condition including at least one of a search direction, a search range, and a search region associated with the event through the communication unit, and receiving information corresponding to the search condition.

According to another aspect of the present invention, there is provided a method of receiving information, including: transmitting, when a specific event occurs, a search condition including at least one of a search direction, a search range, and a search region associated with the event; and receiving information corresponding to the search condition.

Effect of the Invention

According to the present invention, the following effects are obtained.

First, only information corresponding to a specific section, information range, or a specific direction can be selectively received, at the time of receiving various information (for example, traffic related information), and as a result, a user of an electronic apparatus according to the present invention may receive customized information.

Second, an intuitive user interface is provided so as for the user to easily configure a search condition to thereby more rapidly and accurately providing easy information the user.

Third, a search condition suitable for a situation is configured without a particular operation of the user, and as a result, the easy information can be more rapidly and accurately provided to the user.

Fourth, information can be selectively received by deviating from an existing method in which related information is unilaterally transmitted to thereby increasing efficiency of a communication resource of the electronic apparatus.

Fifth, information directly acquired by a user terminal is provided through a social network to thereby provide information having higher intimacy.

MODE FOR CARRYING OUT THE INVENTION

Figure 1:
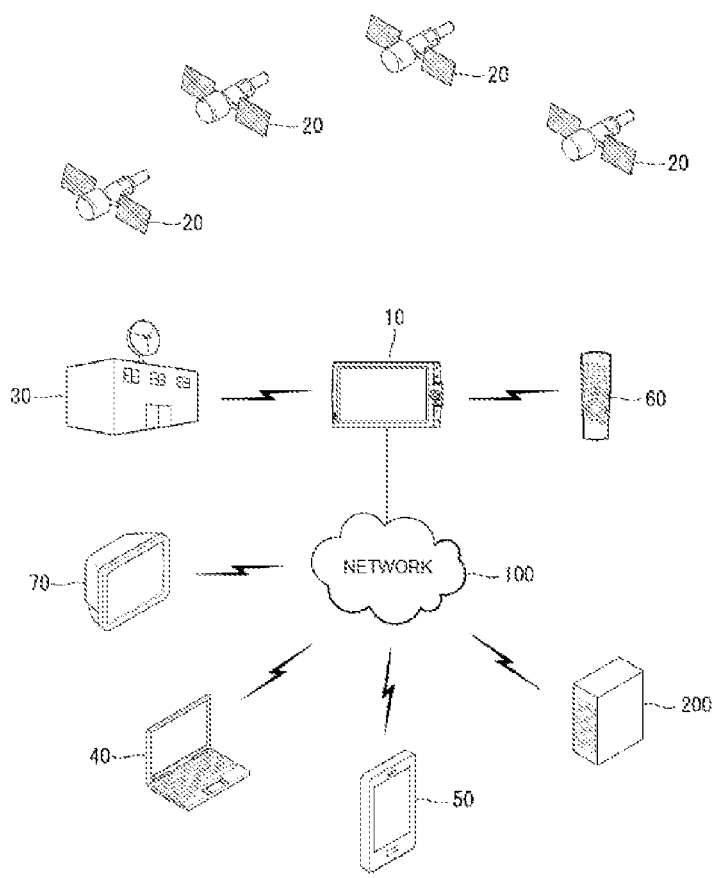
FIGS. 1 and 2 are schematic diagrams schematically illustrating a system environment according to embodiments of the present invention.

The aforementioned objects, features, and advantages of the present invention will be more clear through the following detailed description associated with the accompanying drawings. However, various changes of the present invention can be made and the present invention can have various embodiments, and as a result, hereinafter, specific embodiments will be illustrated in the drawings and described in detail. Like reference numerals principally refer to like elements throughout the specification. FURTHER, when it is determined that the detailed description of the known art related to the present invention may obscure the spirit of the present invention, the detailed description thereof will be omitted. In addition, numeral figures (for example, 1, 2, and the like) used during describing the specification are just identification symbols for distinguishing one element from another element.

It should be understood that when an element is referred to as being 'connected to' or 'coupled to' another element, it may be 'directly connected to' or 'directly coupled to' another element or be connected to or coupled to another element, having the other element intervening therebetween. On the contrary, it should be understood that when an element is referred to as being 'directly connected to' or 'directly coupled to' another element, another element does not intervene therebetween.

Further, a "module" and a "unit" suffixes for components used in the following description are given or mixed and used by considering easiness in preparing a specification and do not have a meaning or role distinguished from each other in themselves.

In recent years, social network services such as Twitter or Facebook have attracted public attention. The social network services have a rapid information spreading effect, and in particular, the social network services is characterized in that information is transferred through a network formed through a specific human relation or a social relationship. The use of the social network services has spread rapidly in order to share information in various levels of society due to rapid transferring of information with construction of a radio data communication network and dissemination and spread of wireless communication terminals such as a smart phone.

According to embodiments disclosed in the present invention, various traffic information, interested information, and the like will be collected and transmitted to a user (alternatively a user terminal) that requires the information through social networks having the same or similar form as the social network services which have been disseminated at present.

Hereinafter, a difference between the existing social network service and the social network constructed by the present invention is clarified and the present invention will be primarily described in detail primary by considering how resulting collected information can be transmitted to a terminal that requires information.

Hereinafter, the present invention will be described in detail with reference to the accompanying drawings.

Figure 2:
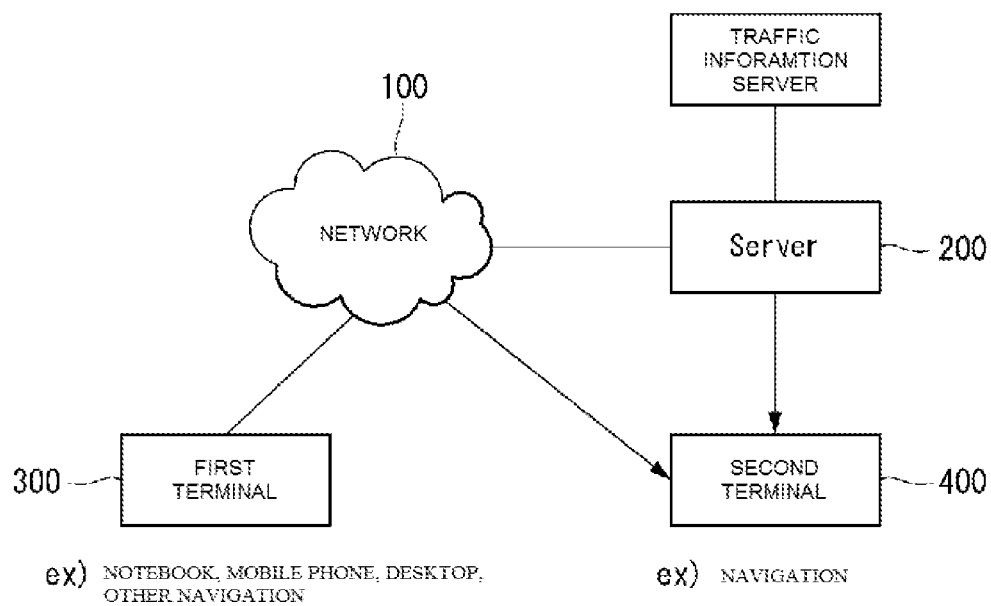

FIGS. 1 and 2 are schematic diagrams schematically illustrating a system environment according to embodiments of the present invention.

A system environment according to the embodiments of the present invention may include various entities. For example, the environment may include a navigation electronic device 10, a satellite 20, a broadcasting station 30, various electronic devices 40, 50, 60, and 70, a server 200, and a network 100.

The navigation (navigator) 10, as an electronic apparatus that performs a function to calculate a present location of the navigation based on a GPS signal, and the like and guide a route to each a destination based on the calculated location, may communicate with the electronic apparatuses 40, 50, 60, and 70 through the network 100 by a wireless or wired method.

In the specification, a method in which the navigation 10 and the plurality of electronic apparatuses 40, 50, 60, and 70 or the server 200 communicate with each other is not limited. A technical spirit of the specification may be applied all wireless communication methods among electronic apparatuses which are present and all communication methods to appear in the future.

Meanwhile, the navigation 10 mentioned in the present invention may mean a vehicle navigation, but may include a high-performance portable electronic apparatus in which mobility (portability) is excellent and various applications may be installed, such as a smart phone or a tablet PC in which an application for performing a navigation function.

Meanwhile, the navigation 10 may be indirectly connected to the network 100 through another electronic apparatus having a communication function, and may be connected with various electronic apparatuses, for example, a notebook 40, a mobile phone 50, a closed circuit TV (hereinafter, referred to as a closed circuit television (CCTV) 70, and the server 200 through the network 100. For example, the navigation 10 may be connected to the network 100 by using a tethering service provided by the electronic apparatus such as the smart phone or may be wirelessly connected to the network 100 through a dongle type electronic apparatus for being wirelessly connected to the network 100.

The navigation 10 may calculate the present location of the navigation 10 by using radio signals received from the artificial satellite 20. The respective artificial satellites 20 may transmit L-band frequencies having different frequency bands. The navigation system 10 may calculate the present location of the navigation system 10 based on a time required for the L-band frequencies transmitted from the respective artificial satellites 20 to reach the navigation system 10.

The broadcasting station 30 may receive various information from the navigation 10, the server 200, and the electronic apparatuses 40, 50, 60, and 70 through the network 100 or a broadcast channel. For example, the navigation 10 may receive and reproduce broadcast contents transmitted form the broadcasting station 30, and the like and may receive real-time traffic information transmitted together with the broadcast contents.

The notebook 40, the mobile phone 50, and the CCTV 70 may acquire various information and transmit the acquired information through the network 200 or directly. Alternatively, the information acquired by the notebook 40, the mobile phone 50, and the CCTV 70 may be transmitted to the server through the network 200 or directly.

The remote controller 60 may transmit various use inputs or commands required for operating the navigation 10 to the navigation 10. As a result, the navigation 10 may perform operations corresponding to the received user inputs or commands.

Meanwhile, according to a system environment associated with embodiments of the present invention, the electronic apparatuses 40, 50, 60, and 70 including the navigation 10 may operate as transmission-side electronic apparatuses that acquire and transmit information or operate as reception-side electronic apparatuses that receive and display information, as illustrated in FIG. 2. Hereinafter, when the various electronic apparatuses 40, 50, 60, and 70 including the navigation 10 operate as the transmission-side electronic apparatuses, the electronic apparatuses will be referred to as a first terminal 300 and when the various electronic apparatuses 40, 50, 60, and 70 operate as the reception-side electronic apparatuses, the electronic apparatuses will be referred to as a second terminal 400.

Referring to FIG. 2, the first terminal 300 may transmit information to the server 200 or the second terminal 400 through the network 100. The first terminal 300 may be the notebook 40, the mobile phone 50, the CCTV 70, or the navigation 10. The first terminal 300 may acquire various type of information such as text information, video information, and audio information and the acquired information may be transmitted to the server 200 through the network 100. In particular, information transmitted from the first terminal 300 to the second terminal 400 may include traffic information, information on a specific interest location (hereinafter, referred to as a point of interest (POI)'), chatting information, and the like.

The server 200 accesses the network 100 to search/receive the information transmitted from the first terminal 300. The received information may be stored in the server 200.

Meanwhile, the server 200 may continuously monitor a location of the first terminal 300. For example, in the case of the plurality of first terminals 300, the server 200 periodically receives location information from the first terminals 300 and may continuously monitor positions of the first terminals 300 based on the received location information.

Meanwhile, the server 200 receives the location information from the first terminal 300 in order to monitor the location of the first terminal 300, and may acquire location information from the first terminal 300 when a predetermined event occurs, instead of periodically receiving the location information.

In this case, the location information may be transmitted by a request of the server 300. Further, when the first terminal 300 detects occurrence of a predetermined event, the location information of the first terminal 300 may be transmitted to the server 200 without a specific request of the server 200.

The server 200 may also monitor a location of the second terminal 400 together. A method of monitoring a location of the second terminal 400 is the same as or similar to the method of monitoring the location of the first terminal 300.

The second terminal 400 may transmit condition information to the server 200, and the server 200 may transmit information suitable for the condition to the second terminal 400 by considering the condition information received from the second terminal 400. As a result, the second terminal 400, that is, the server 200 configures customized information for the second terminal 400 to transmit the customized information to the second terminal 400. The second terminal may be the navigation 10.

The network 100 may be implemented by various methods. For example, the network related to the embodiments of the present invention may include a social network.

Hereinafter, a social network related to the embodiments of the present invention will be described.

Figure 3:
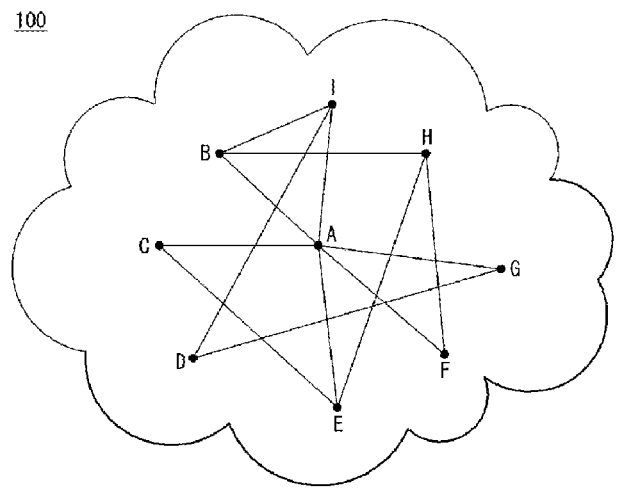
FIG. 3 is a conceptual diagram for describing a social network according to embodiments of the present invention.

FIG. 3 is a conceptual diagram for describing a social network according to embodiments of the present invention.

The social network, as one of research fields of web science, means a social relationship structure made by an interdependent relationship (tie) between respective nodes when a personal or a group becomes one node on the Web. In this case, all of the nodes are independent subjects which exist in the network, and the tie means a relationship between the respective nodes (hereinabove, a source is a Wikipedia).

The social network according to the present invention may be configured by one or more second nodes B, C, D, E, F, G, H, and I having a relationship with a first node A, on the basis of the first node A.

The first node and the second nodes A, B, C, D, E, F, G, H, and I may be specific positions, specific roads, specific buildings, specific users, specific terminals, and the like.

For example, when the first node A is a specific user, other users or terminals having a relationship with the user are the second nodes to configure the social network 100 together with the specific user.

When the first node A is a specific road, other roads, buildings, terminals, or users having a relationship with the specific road are the second nodes to configure the social network 100 together with the specific road.

When the first node A is a specific building, other buildings, roads, terminals, or users having a relationship with the specific building are the second nodes to configure the social network 100 together with the specific building.

When the first node A is a specific position, other positions, roads, buildings, terminals, or users having a relationship with the specific location are the second nodes to configure the social network 100 together with the specific position.

Since the social network 100 according to the present invention is formed based on the specific node, various social networks 100 may be configured according to the specific node. For example, when the specific node is 'Nambusunhwanno', 'Star Tower', 'Gangnam Station', 'Yeouido', and the like, information networks 500 formed around the respective specific nodes may be different from each other. In this case, the respective information networks 500 may not coincide with each other, but some of other nodes included in one information network 100 may be included in even another information network 100. For example, when it is assumed that a user A and a user B are included in the network 100 formed around the node 'Nambusunhwanno', the user A and a user C may be included in the network formed around the node 'Star Tower'. That is, the user A may be included in both the network formed around 'Nambsunhwanno' and the network formed around 'Star Tower'.

In this case, the nodes A, B, C, D, E, F, G, H, and I may have location properties corresponding to the nodes. For example, when the nodes are the specific position, the specific road, the specific building, and the like, positions of the specific position, the specific road, the specific building, and the like may be location properties corresponding to the nodes, and when the nodes are the specific users or the specific terminals, current positions of the specific terminals or the specific users may be location properties corresponding to the nodes.

Further, the first node A may be divided into a static node and a dynamic node, and the static node means a node in which a location attribute corresponding thereto is not changed like the specific position, the specific road, the specific building, and the like, and the dynamic node means a node in which a location attribute corresponding thereto may be changed like the specific user or the specific electronic device with time elapsed.

Further, all of the first node A and the second nodes B, C, D, E, F, G, H, and I have relationships. However, the nodes B, C, E, F, G, and I have a direct relationship with the first node A, but the nodes D and H have a indirect relationship with the first node A (In the drawing, a line connecting the nodes means a case where the connected nodes have a direct relationship with each other. For example, the node D has a relationship with the first node A through the node I or the node G, and the node H has a relationship with the first node A through the node B or the node F.

In this case, the nodes B, C, E, F, G, and I will be defined to have a primary relationship with the first node A, and the nodes D and H will be defined to have a secondary relationship with the first node A. Of course, although not illustrated, there is no relationship with the nodes B, C, E, F, G, and I, but when a node which has a relationship with any one of the nodes D and H exists, the node may be defined to have a tertiary relationship with the first node A.

Meanwhile, according to the embodiment of the present invention, a relationship between the first node A and the second nodes B, C, D, E, F, G, H, and I may be statically maintained, but may be dynamically changed according to a location relationship between the first node A and the second nodes B, C, D, E, F, G, H, and I. In other words, when user B (second node) sets Yeoksam Station (first node) as the interest region, a predetermined relationship may be formed between the first node and the second node by an intention of user B. Contrary to this, when a terminal (second node) of the user C is positioned within a predetermined range from Gangnam Station (first node), the user C may naturally have a relationship with Gangnam Station (second node) regardless of the intention of the user C.

According to another embodiment of the present invention, the first node may have a specific keyword related to the first node as an attribute thereof, and when the specific keyword is included in information generated and uploaded by the second node, a relationship between the first node and the second node may be formed. In other words, when user D knows a fact that traffic jam occurs in a partial section of Nambusunhwanno due to fire while watching news in home although user D is positioned in Nambusunhwanno at present, user D generates and uploads information 'bidirectional congestion caused due to fire in section a-b of Nambusunhwanno' in home, and as a result, user D may have a relationship with Nambusunhwanno (first node) due to a specific keyword 'Nambusunhwanno' uploaded by the second node.

As described above, the relationship between the first node and the second node may be statically maintained and changed continuously according to a location relationship, a keyword relationship, and the like therebetween, and as a result, the network formed based on the specific node may generate information having very high relation with the specific node.

As such, an existing social network may be formed by only a request between the users according to a social relationship between the users, while the social network according to the present invention may have a relationship according to a location relationship between the nodes in addition to the relationship formation. As a result, various traffic information which may be an interest target in a specific region and a variety of information which is generated or uploaded by various entities based on the specific location may form the social network. According to such a characteristic, in the social network according to the present invention, the nodes configuring the social network may be continuously changed with time.

According to an embodiment of the present invention, as described above, the social network 100 may be formed, and the second terminal 400 may receive various information through the social network 100. However, the spirit of the present invention is not limited to communication of various electronic devices through the social network.

Hereinabove, a system environment related to the embodiments of the present invention is described in detail. Hereinafter, a configuration of a navigation and a configuration of a server related to the embodiments of the present invention will be described.

First, a configuration of a navigation related to an embodiment of the present invention will be described.

Figure 4:
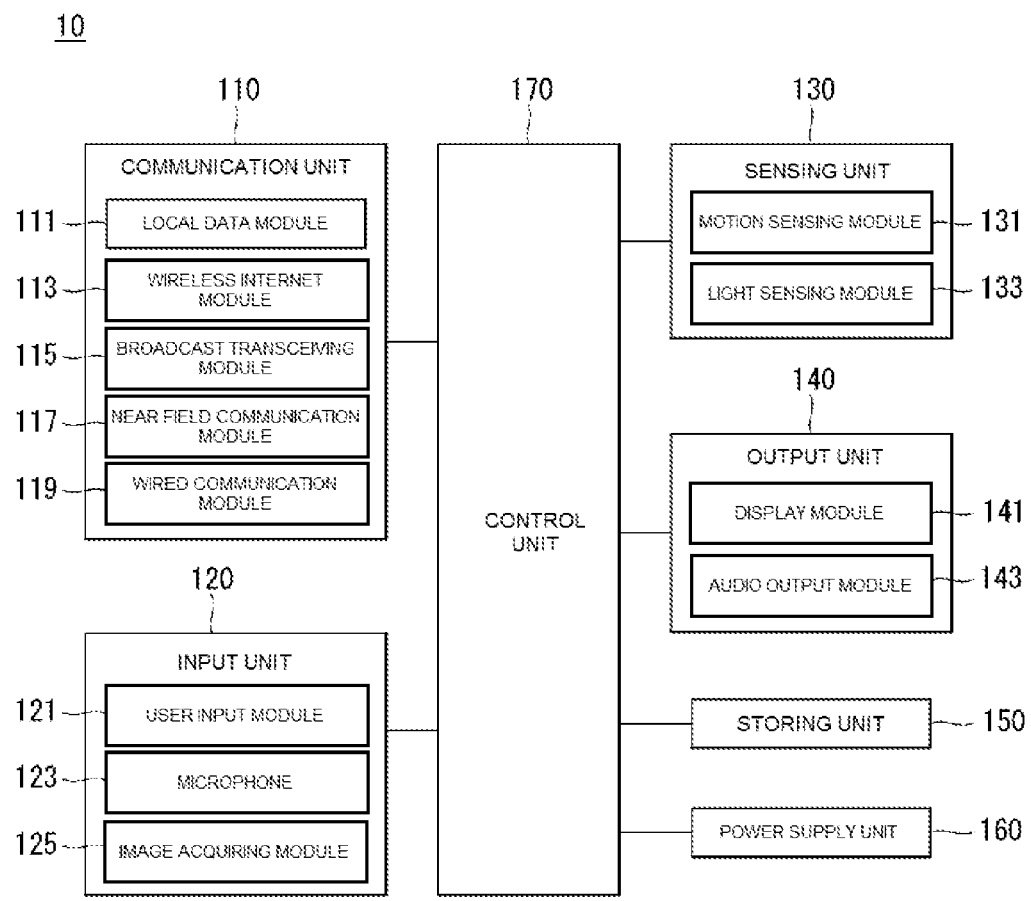
FIG. 4 is a block configuration diagram illustrating a schematic configuration of a navigation according to an embodiment of the present invention.

FIG. 4 is a block configuration diagram illustrating a schematic configuration of a navigation according to an embodiment of the present invention.

Referring to FIG. 4, a navigation 10 may include a communication unit 110, an input unit 120, a sensing unit 130, an output unit 140, a storing unit 150, a power supply unit 160, and a controller 170. Since the constituent elements illustrated in FIG. 4 are not necessary, a car navigation may be implemented to have more constituent elements or less constituent elements.

Hereinafter, the constituent elements will be described in sequence.

The communication unit 110 may include one or more module which may communicate between the navigation 10 and a communication system, between the navigation 10 and a network in which the navigation 10 is positioned, or between the navigation 10 and other electronic devices. For example, the communication unit 110 may include a location data module 111, a wireless internet module 113, a broadcast transceiving module 115, a near field communication module 117, a wired communication module 119, and the like.

The location data module 111 is a module for verifying or acquiring location data of the navigation 10. As a method of acquiring the location data by the location data module 111, a method of acquiring location data through a global navigation satellite system (GNSS) may be used. The GNSS means a navigation system which may calculate a location of a receiving terminal by using a radio signal received from a satellite 20. As a detailed example of the GNSS, according to an operating subject, a global positioning system (GPS), Galileo, a global orbiting navigational satellite system (GLONASS), COMPASS, an Indian regional navigational satellite system (IRNSS), a Quasi-Zenith satellite system (QZSS), and the like may be included. The location data module 111 of the navigation 10 according to the embodiments of the present invention may receive a GNSS signal servicing in a region where the navigation 10 is used to acquire location data. The location data module 111 continuously calculates a current location of the navigation 10 in real time, and speed information may be calculated by using the calculated current position. Particularly, the location data acquired by the location data module 111 may include a longitude and a latitude.

The wireless internet module 113 is a device accessing to a wireless Internet to acquire or transmit data. The wireless Internet accessing though the wireless internet module 113 may include a wireless LAN (WLAN), a wireless broadband (Wibro), a world interoperability for microwave access (Wimax), a high speed downlink packet access (HSDPA), and the like.

The broadcast transceiving module 115 is a device receiving a broadcast signal through various broadcasting systems. The broadcasting systems which may be received by the broadcast transceiving module 115 may include a DMBT (Digital Multimedia Broadcasting Terrestrial), a DMBS (Digital Multimedia Broadcasting Satellite), a MediaFLO (Media Forward Link Only), a DVBH (Digital Video Broadcast Handheld), an ISDBT (Integrated Services Digital Broadcast Terrestrial), and the like. The broadcast signal received by the broadcast transceiving module 115 may include traffic data, life data, and the like.

The near field communication module 117 means a module for near field communication. As a near field communication technology, a Bluetooth, a radio frequency identification (RFID), an infrared data association (IrDA), an ultra wideband (UWB), a ZigBee, and the like may be used.

The wired communication module 119 serves to provide an interface with other electronic devices connected to the navigation 10. For example, the wired communication module 119 may be an USB module which may communicate through an USB port.

The input unit 120 is a module which may generate input data for an operation control of the navigation 10, and may convert a physical input from the outside into a predetermined electric signal to generate input data. The input unit 120 may include a user input module 121, a microphone 123, an image acquiring module 125, and the like.

The user input module 121 receives a control input for an operational control of the navigation 10 from the user. The user input module may be configured by a keypad, a dome switch, a touch pad (static pressure/static electricity), a jog wheel, a jog switch, and the like.

The microphone 123 is a device which receives a user's voice and a sound generated inside and outside of a car.

The image acquiring module 125 is a device which acquires images inside and outside of the car. For example, the image acquiring module 125 may include a camera. The image acquiring module 125 is not an essential constituent element to be necessarily included in the navigation 10. The navigation 10 may be linked with a separate device which may acquire inner and outer images of the car, for example, another independent electronic device such as a car black box if necessary, and image information may be acquired by the electronic device, instead of the image acquiring module 125.

The sensing unit 130 detects a current state of the navigation 10 to generate a sensing signal for controlling an operation of the navigation 10. The sensing unit 130 may include a motion sensing module 131, a light sensing module 133, and the like.

The motion sensing module 131 may sense a motion on a tertiary space of the navigation 10. The motion sensing module 131 may include a triaxial geomagnetic sensor and a triaxial acceleration sensor. By combining motion data acquired by the motion sensing module 131 with location data acquired by the location data module 111, a trace of the car with the navigation 10 may be more accurately calculated.

The light sensing module 133 is a device which measures ambient illuminance of the navigation 10. By using illuminance data acquired by the light sensing module 133, brightness of a display unit 145 may be changed so as to correspond to ambient brightness.

The output unit 140 is a device which outputs data by the navigation 10. The output unit 140 may include a display module 141, an audio output module 143, and the like.

The display module 141 is a device outputting data which may be visually recognized by the navigation 10. Meanwhile, when the display module 141 is a touch screen, the display module 141 may serve as the output unit 140 and the input unit 120 of the data as described above.

The audio output module 143 outputs audio data which may be acoustically recognized. The audio output module 143 outputs an audio signal associated with a function (for example, a path guiding function) performed in the navigation 10. The audio output module 143 may include a receiver, a speaker, a buzzer, and the like.

The storing unit 150 may store a program for an operation of the navigation 10, and may temporarily store input/output data (path data and image data) in association with the navigation 10. Further, the storing unit 150 may store map data used in a path guiding service. The storing unit 150 may be embedded in the navigation 10 or attached to and detached from the navigation 10, and may include at least one type of storage medium of flash memory type, hard disk type, multimedia card micro type, and card type memories (for example, SD or XD memory and the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The navigation 10 may operate in association with a web storage which performs a storage function of the storing unit 150 on the Internet.

The power supply unit 160 receives external power and internal power to supply power required for an operation of respective constituent elements of the navigation 10 or other devices connected to the navigation 10.

The controller 170 generally controls the entire operation of the navigation 10. Furthermore, the controller 170 may output a control signal controlling other devices connected to the navigation 10. The controller 170 may include an input/output unit (that is, an interface unit) for transmitting and receiving information and/or control signals with other modules (that is, the communication unit 110, the input unit 120, the sensing unit 130, the output unit 140, the storing unit 150, the power supply unit 160, and the like) descried above.

Subsequently, a configuration of a server related to the embodiments of the present invention will be described.

Figure 5:
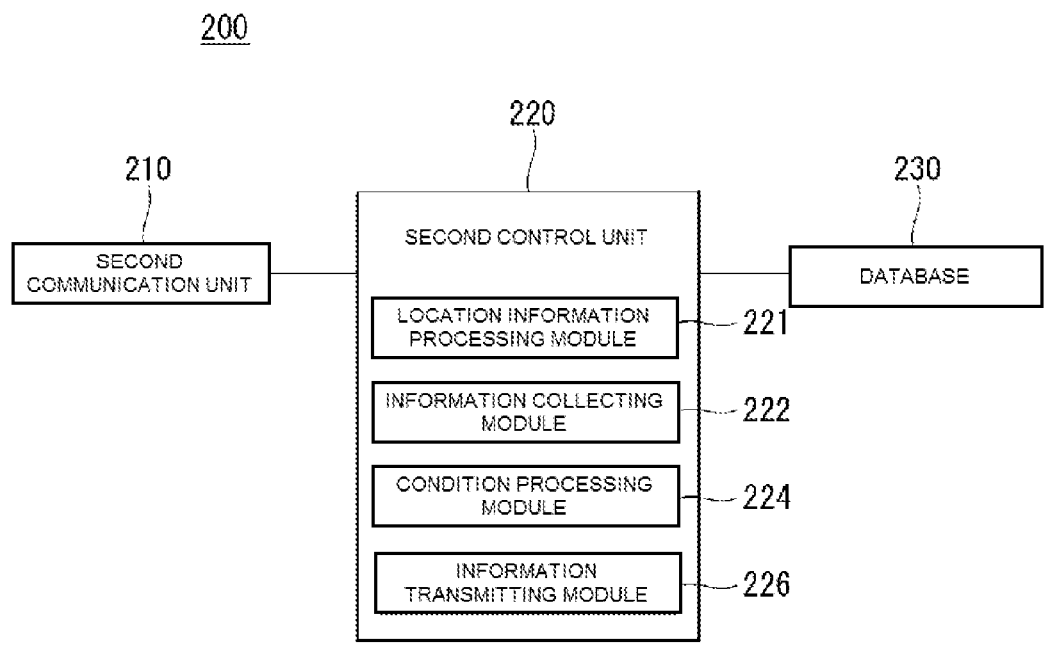
FIG. 5 is a block configuration diagram illustrating a configuration of a server according to embodiments of the present invention.

FIG. 5 is a block configuration diagram illustrating a configuration of a server according to embodiments of the present invention.

Referring to FIG. 5, the server 200 may include a communication unit 210, a database 230, and a controller 220. Since the constituent elements illustrated in FIG. 5 are not necessary, the server 200 may be implemented to have more constituent elements or less constituent elements.

Hereinafter, the constituent elements will be described in sequence.

The second communication unit 210 may communicate between the server 200 and the network 100. For example, the second communication unit 210 may include various communication modules which may wirelessly communicate through wired/wireless lines.

The database 230 may store various information collected from the network 100. The database 230 may be implemented by various types of storage media, like the storing unit 150 of the navigation 10 described above.

The second controller 220 generally controls the entire operation of the server 200. The second controller 220 may include a location information processing module 221, an information collecting module 222, a condition processing module 224, and an information transmitting module 226.

The location information processing module 221 receives location information corresponding to the first terminal 300 and/or the second terminal 400 from the first terminal 300 and/or the second terminal 400 through the second communication unit 210, and calculates necessary information based on the received location information.

The necessary information may include information on a section in which the first terminal 300 and/or the second terminal 400 are positioned, information on a movement speed of the first terminal 300 and/or the second terminal 400, information on a movement direction of the first terminal 300 and/or the second terminal 400.

The location information processing module 228 may transmit the calculated information to the first terminal 300 and/or the second terminal 400 through the second communication unit 210.

The information collecting module 222 serves to collect necessary information from the network 100 through the second communication unit 210.

Meanwhile, the information collecting module 222 determines whether the information collected from the second communication unit 210 accords with a predetermined condition, and when the information does not accord with the condition, a filtering operation may be performed, in which the collected information is not stored in the database 230 but discarded, or temporarily stored in the database 230 and then discarded. For example, by considering information (hereinafter, referred to as the same section information) corresponding to the same section and/or location of the collected information, after an average value and/or a deviation of the information acquired from the same section information are/is calculated, information deviating from a predetermined reference range may be not stored in the database 230, but filtered.

Further, the second controller 220 may perform an operation of applying evaluation information to the collected information. The evaluation information applied to the collected information may be calculated by various references.

The condition processing module 224 serves to process the condition information received from the second terminal 400 through the second communication unit 210. Although described below in detail, particularly, the condition processing module 224 may search information suitable for the condition from the information stored in the database 230 or the information on the network 100, based on the condition information. For example, the condition processing module 224 extracts information suitable for the condition information from the information stored in the database 230. The information extracted from the condition processing module 224 may be different from each other according to a content configuring the condition. As described above, the extracted information will be defined as a dynamic information group in the specification. Generating a dynamic information group based on the condition information by the condition processing module 224 will be described below in detail.

The information transmitting module 226 serves to transmit predetermined information to the second terminal 400 with reference to the dynamic information group. In the case where an amount of information (information included in the dynamic information group) to be transmitted to the second terminal 400 exceeds a predetermined reference when the information is transmitted to the second terminal 400, the information transmitting module 226 may transmit only a part of the information to the second terminal 400. In this case, the information transmitting module 226 may select a part of the information to be first transmitted based on various references. For example, the information transmitting module 226 may select the information to be first transmitted by considering evaluation information applied to the information and the like.

Hereinafter, a method of acquiring and collecting information by an interaction between the first terminal and the server under the aforementioned system environment. For convenience of description, hereinafter, the first terminal 300 and the second terminal 400 described with reference to FIG. 2 will be described to be implemented by the navigation 10 described with reference to FIG. 4. Furthermore, in the case of a specific electronic device corresponding to the first node and the second node described with reference to FIG. 3, the specific electronic device will be described to be implemented by the navigation 10 described with reference to FIG. 4. However, the spirit of the present invention is not limited to electronic devices corresponding to the first and second terminals 300 and 400 and/or the first node and the second nodes which are implemented by the navigation 10.

Figure 6:
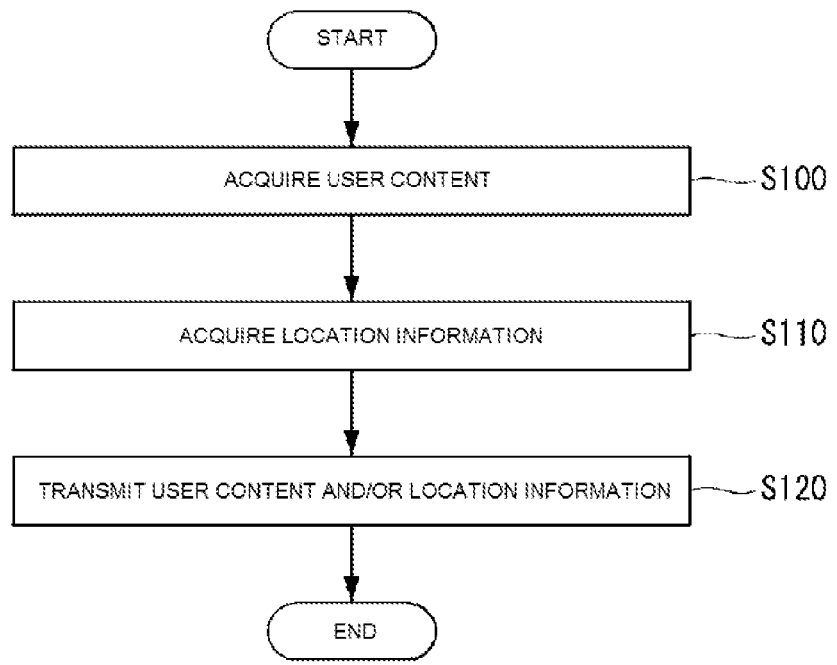
FIG. 6 is a flowchart for describing a method of acquiring information according to embodiments of the present invention.

FIG. 6 is a flowchart for describing a method of acquiring information according to embodiments of the present invention.

The navigations 10 and 300 may acquire various information through the input unit 120 (S100).

For example, information which is directly input from the user may be acquired by the user input module 121. Further, a user's voice or a sound generated from the inside and the outside of the car where the navigations 10 and 300 are attached or installed may be acquired by the microphone 123. Further, images of the inside and the outside of the car where the navigations 10 and 300 are attached or installed may be acquired through the image acquiring module 125. Hereinafter, the information acquired by the input unit 120 of the navigations 10 and 300 may be referred to as a user content. The user content may include information regarding traffic, and the user content may be referred to as a content regarding traffic.

The navigations 10 and 300 may acquire location information (S110).

For example, the navigations 10 and 300 may calculate a coordinate value (for example, longitude and latitude coordinates) where the navigations 10 and 300 are currently positioned, by using a GPS signal received from the location data module 111.

Next, the navigations 10 and 300 may transmit the user content to the server 200 (S210).

In this case, the navigations 10 and 300 may transmit the acquired location information to the server 200. The navigations 10 and 300 may transmit visual information in addition to the location information to the server 200.

The location information may be location information calculated after and before a time when the user content is acquired.

The location information may be transmitted to the server 200 while the user content is acquired, may be transmitted together while the user content is transmitted to the server 200, and may be transmitted after the user content is transmitted to the server 200.

The location information may correspond to the user content. For example, when a first user content acquired by the navigations 10 and 300 is generated at a location A and a second user content is generated at a location B, the first user content may correspond to the location A, and the second user content may correspond to the location B.

Meanwhile, location information corresponding to one content may be in plural. While a third user content is acquired, the location of the navigations 10 and 300 may be changed with time, and as a result, a plurality of location information may correspond to the third user content. For example, in the case where the third user content is a traveling image acquired during traveling, when the navigations 10 and 300 are positioned at a location C at the time of starting to acquire the travelling image, the navigations 10 and 300 are positioned at a location D at a predetermined time after the travelling image starts to acquire the travelling image, and the navigations 10 and 300 are positioned at a location E at the time when the acquiring of the travelling image is finished, the location information corresponding to the third user content may be the location C, the location D, and the location E. Of course, three or more location information may correspond to one content, or one location information may correspond to one content.

As described above, visual information may correspond to the user content. A method of corresponding to the visual information is the same as or similar to the method of corresponding to the user content.

The navigations 10 and 300 may further calculate speed information, direction information, section information, and the like corresponding to the user content. When the speed information, the direction information, the section information, and the like are further calculated, the calculated information may be transmitted to the server 200.

The speed information, the direction information, the section information, and the like corresponding to the content may correspond to a movement speed and a movement direction of the navigations 10 and 300 which are calculated while the user content is acquired, and a specific road section which the location of the navigations 10 and 300 belongs to.

For example, when the first terminal 300 is positioned at 'Yangjae Station', a user of the first terminal 300 inputs information 'driving at slow speed from Yangjae Station to Gangnam Station', and as a result, location information 'Yangjae Station' may be transmitted to the server 200 together with the information input by the user. The location information may be acquired by the aforementioned location data module 111. Further, the location information may be transmitted in a form of a text 'Yangjae Station', but may be transmitted in forms of a longitude coordinate and a latitude coordinate acquired by the location data module 111.

Further, the first terminal 300 may transmit direction information associated with the acquired information together when the information is transmitted to the server 200. The direction information may reflect a direction in which the first terminal 300 proceeds when the information is acquired by the first terminal 300. Further, the first terminal 300 may transmit direction information related to the acquired information at the time of transmitting the information to the server 200. The direction information may reflect a direction in which the first terminal 300 goes at the time when the first terminal 300 acquires the information. For example, when the first terminal 300 goes from 'Yangjae Station' to 'Gangnam Station' on Gangnamdaero, a voice of the user 'smooth traffic from Yangjae Station to Gangnam Station' through the microphone 123 of the first terminal 300 is acquired, and as a result, the acquired voice (that is, voice information) of the user may be transmitted to the server 200 together with the direction information.

The speed information may be calculated by a plurality of location information acquired as described above. For example, when the location information is periodically acquired, by using a distance between the plurality of location information and a predetermined acquiring cycle, the movement speed of the navigation 10 may be calculated. The speed information may be directly acquired from the car in which the navigations 10 and 300 are installed, unlike this. For example, the speed information of the car may be acquired from an engine control unit (ECU) which is installed in the car.

The direction information may be calculated by the plurality of location information acquired as described above. For example, when the plurality of location information is acquired while the user content is acquired, the direction information may be calculated by a direction of a trace formed by the plurality of location information.

The section information may be calculated by the plurality of location information acquired as described above. For example, when the plurality of location information is included in a road section (for example, section Yeoksam Station-Gangnam Station of Teheran Street) on map data, the road section on the map data may be the section information.

Meanwhile, according to another embodiment of the present invention, the location information and/or the direction information may be information extracted from information (that is, the user content) to be transmitted.

For example, when the user inputs 'smooth traffic to Gwachedon on Yangjaedaero' through the first terminal 300, the first terminal 300 may extract location information and/or direction information from the information input by the user. That is, 'Yangjaedaero' may be extracted as the location information and 'to Gwachedon' may be extracted as the direction information.

Further, according to yet another embodiment of the present invention, the location information may reflect a location attribute applied to the node associated with the input information (that is, the user content).

For example, when 'Gangnam Station' is present as a first node, the first terminal 300 as a second node having a relationship with the 'Gangnam Station' inputs 'signal fault at an intersection' with respect to the node 'Gangnam Station', and as a result, the input information may be transmitted to the server 200 together with 'Gangnam Station' which is location information associated therewith. When a direction attribute is applied to the first node, the direction information reflecting the direction attribute applied to the first node may be transmitted to the server 200.

As described above, the information calculated by the embodiments of the present invention may be transmitted to the server 200 while the user content is acquired, may be transmitted together while the user content is transmitted to the server 200, and may be transmitted after the user content is transmitted to the server 200.

Meanwhile, according to an embodiment of the present invention, the navigations 10 and 300 may transmit only the location information and/or the visual information corresponding to the user content to the server 200, and as a result, the speed information, the direction information, the section information, and the like described above may be calculated by the server. A method of calculating the speed information, the direction information, and the section information by the server 200 is the same as or similar to the method of calculating the information by the navigations 10 and 300 described above. That is, the server 200 may calculate the speed information, the direction information, the section information, and the like by using the plurality of location information received from the navigations 10 and 300. Further, the server 200 may extract the direction information, the location information, or the section information from the user content received from the navigations 10 and 300. Further, the server 200 may acquire the location information from a location attribute applied to the node associated with the user content received from the navigations 10 and 300.

As described above, the information (the user content) may be acquired by the first terminal 300, and the acquired information may be transmitted to the server 200. Further, the information (the user content) may correspond to one or more of the location information, the speed information, the direction information, and the section information.

Hereinafter, a method of supplying information under the aforementioned system environment will be described.

Figure 7:
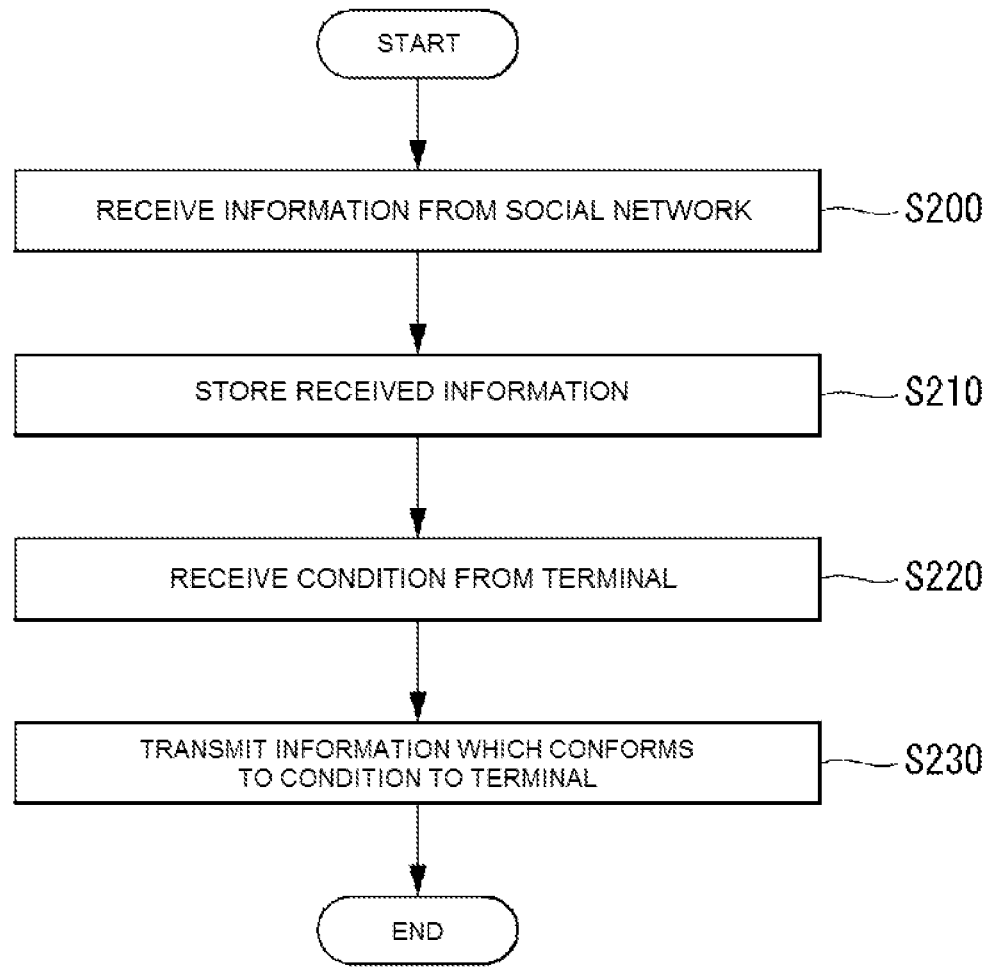
FIG. 7 is a flowchart for describing an operating method of a server according to embodiments of the present invention.

FIG. 7 is a flowchart for describing an operating method of a server according to embodiments of the present invention.

First, the server 200 receives various information (for example, a user content and the like) from the network 100 as described above (S200).

The various received information may include traffic-related information, traffic information, information on a specific interest location (hereinafter, referred to as a 'point of interest (POI)'), chatting information, and the like. Further, the various received information may correspond to visual information, location information, direction information, and speed information associated therewith. Furthermore, the various information may correspond to identification information on a user transmitting the various information or a terminal of the user. The identification information on the user or the terminal of the user may be transmitted to the server from the navigations 10 and 300 when the user content is transmitted.

Next, the server 200 stores the received information to a database (S210).

The received information may be selectively stored. That is, all the received information may be stored, and only a part of the received information may be stored. For example, the server 200 may selectively store only the information suitable for the reference, after the content of the information received through the social network 100 is evaluated according to a predetermined reference. The predetermined reference may be determined by reflecting an object of information to be supplied from the server 200 to the navigation 10. For example, when the traffic-related information is transmitted to the navigation 10, the server 200 may determine whether the received information includes the traffic-related information, and when it is determined that the traffic-related information is not included, the received information may be not stored but discarded. Hereinafter, an operation of the server 200 which selectively stores the received information in the database is wholly referred to as a "filtering operation" or "filtering".

When the server 200 stores the received information (that is, the user content) in the database, the server 200 may map and store the received information in map data for a navigation. In this case, the server 200 may map the received information in the map data by using the location information and/or the section information corresponding to the information.

The information may be classified and stored according to the traffic-related information. For example, the information may be classified and stored for each of administrative districts such as si, gun, and gu and distinguished and stored for each of roads such as Woigwaksunhwanno, Nambusunhwanno, and Olympic Highway. Alternatively, the information may be classified and stored with respect to predetermined road sections such as section A-B of Woigwaksunhwanno and section C-D of Nambusunhwanno.

Furthermore, the information may be further classified and stored by considering direction information included in the information. For example, the information may be classified into direction A of section A-B of Woigwaksunhwanno or direction B of section A-B of Woigwaksunhwanno.

The server 200 may further consider the speed information corresponding to the information, and classify and store the speed information.

Meanwhile, the server 200 may add evaluation information to the information and store the evaluation together. The evaluation information may represent reliability of the information. For example, as a level of the evaluation information is higher, the evaluation information may represent information having high reliability, and on the contrary, as a level of the evaluation information is lower, the evaluation information may represent information having low reliability.

A method of adding the evaluation information to the information may be various. For example, the evaluation information may be calculated by considering the he evaluation information applied to the user transmitting the information or the terminal. Further, when the information includes the traffic-related information, the evaluation information may be calculated by considering a result compared with the traffic information and the like supplied from another traffic information supplying server.

Meanwhile, the server 200 may discard the information when a predetermined time elapses after the information is acquired, by using the visual information corresponding to the information.

Next, the server 200 receives a condition from the second terminal 400 (S220).

The condition is generated by the second terminal 400, and the navigation 10 may be generated by various algorithms. A detailed embodiment for the generation of the condition by the second terminal 400 will be described below.

The condition may include at least one of a specific user, a specific terminal, a position, a time, and a direction.

According to an embodiment of the present invention, the server 200 may select a little information by considering the received condition. For example, when the condition information includes a location and a direction, the server 200 may select information transmitted from the first terminals (for example, the first terminals passing through the location in the direction) corresponding to the location and the direction.

Meanwhile, according to an embodiment of the present invention, from a lot of information stored in the server, or from a lot of information accessible through the social network 100, at least one is selected to configure a dynamic information group. Since the dynamic information group is closely associated with the condition generated and transmitted from the second terminal 400, the dynamic information group will be described together when a detailed embodiment in which the second terminal 400 generates the condition is described below.

The server 200 selects a part of the collected information by considering the received condition to transmit the selected information to the second terminal (S230).

The server 200 selects a part of the collected information by considering the received condition to generate the dynamic information group. Subsequently, the server 200 may transmit information included in the dynamic information group to the second terminal 400. That is, the server 200 may transmit the information included in the dynamic information group configured from the collected information to the second terminal 400.

According to an embodiment of the present invention, the server 200 stores the information acquired by the first terminal 300 as it is, and then may transmit the stored information to the second terminal 300 without a separate processing. For example, when a travelling image acquired during travelling by the first terminal 300 is photographed, the server 200 receives/stores the photographed image and then may transmit the image as it is to the second terminal 400 without a separate processing, when the travelling image is suitable for the received condition.

On the contrary, according to another embodiment of the present invention, the server 200 may store the information acquired by the first terminal 300 and then process the information before the information is transmitted to the second terminal 400, and thereafter, transmit the processed information to the second terminal 400. A method of processing the information may be various. A detailed method of processing the information will be described below.

As such, according to the embodiments of the present invention, the server 200 may collect various information from the social network 100 formed by various relationships. In addition, after a little information is selected from the various information by considering the condition information received from the second terminal 400, the selected information is transmitted to the second terminals. As a result, only information necessarily required for the second terminal 400 may be provided.

Hereinafter, a method of receiving information according to the embodiments of the present invention will be described. Particularly, at the second terminal 400 side, a method of receiving information by an interaction with the server 200 will be described. Hereinafter, for convenience of description, it is assumed and will be described that the second terminal 400 is implemented by the navigation 10 described above. Meanwhile, hereinabove, the condition which is generated from the second terminal 400 to be transmitted to the server 200 may be referred to as a search condition below in more detail.

Figure 8:
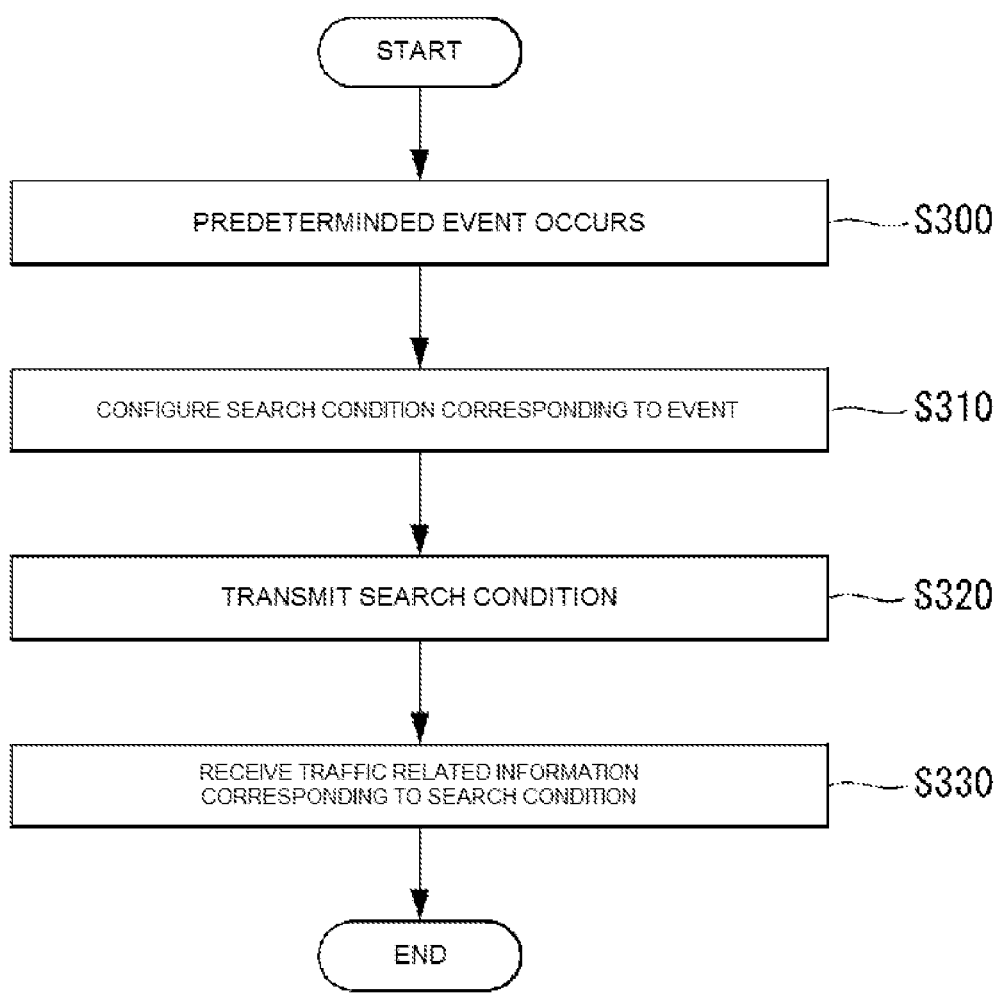
FIG. 8 is a flowchart for describing a method of receiving information according to embodiments of the present invention.

FIG. 8 is a flowchart for describing a method of receiving information according to embodiments of the present invention.

A predetermined event may occur in navigations 10 and 400 (S300). The navigations 10 and 400 may monitor whether the predetermined event occurs.

A type of the predetermined event may be determined in the navigations 10 and 400. The predetermined event may include, for example, a user's specific input aspect, a request for a specific operation to the navigations 10 and 400, a driving state of a vehicle attached and installed with the navigations 10 and 400. Various embodiments for the predetermined event will be described below in detail.

When the predetermined event occurs, a search condition corresponding to the occurred event may be configured (S310).

A method of configuring the search configuration may be changed depending on the predetermined event. In other words, a content of information that configures the search condition may be changed, for example, when a first event occurs, the search condition may be configured to include only a search location and when a second event occurs, the search condition may be configured to include a search location and a search direction. Alternatively, when a third event occurs, the search condition may be configured to include the search location and a search range. Alternatively, in some cases, the search condition may be configured to include the search location, the search direction, and the search range.

The navigations 10 and 400 may transmit the search condition configured to correspond to the predetermined event to a server 200 (S320).

Subsequently, the navigations 10 and 400 may receive related information corresponding to the search condition (S330). As the search condition is transmitted to the server 200, the server searches or selects information corresponding to the search condition and transmits the searched information to the navigations 10 and 400 as described above.

Hereinafter, it will be how predetermined events will be designated and embodiments of the present invention regarding how the search condition is configured will be described in detail.

First Embodiment

According to a first embodiment of the present invention, when a predetermined stroke is input, the navigations 10 and 400 may generate a search condition corresponding to the stroke. Hereinafter, referring to FIGS. 9 to 12, the first embodiment of the present invention will be described.

Figure 9:
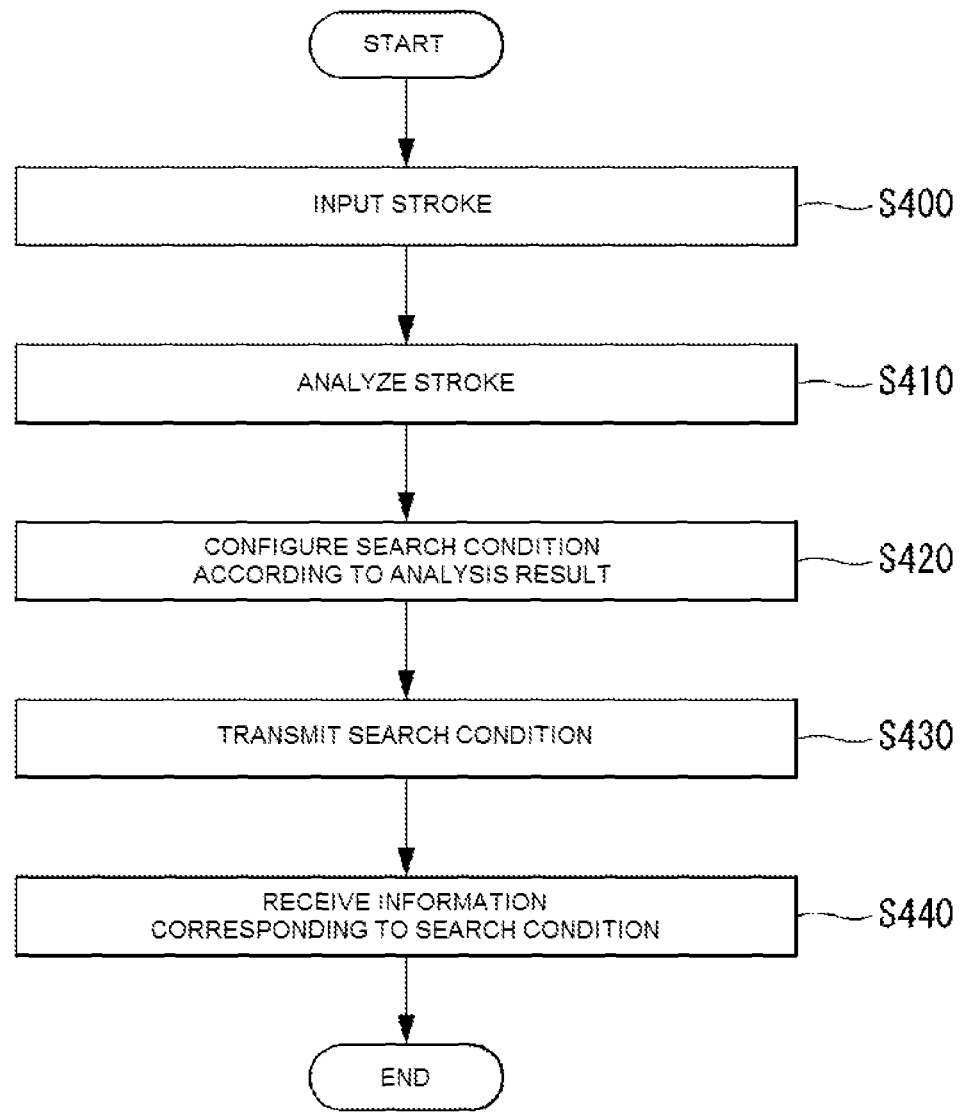
FIG. 9 is a flowchart for describing a method of receiving a configuration and information of a search condition according to a first embodiment of the present invention.
Figure 10:
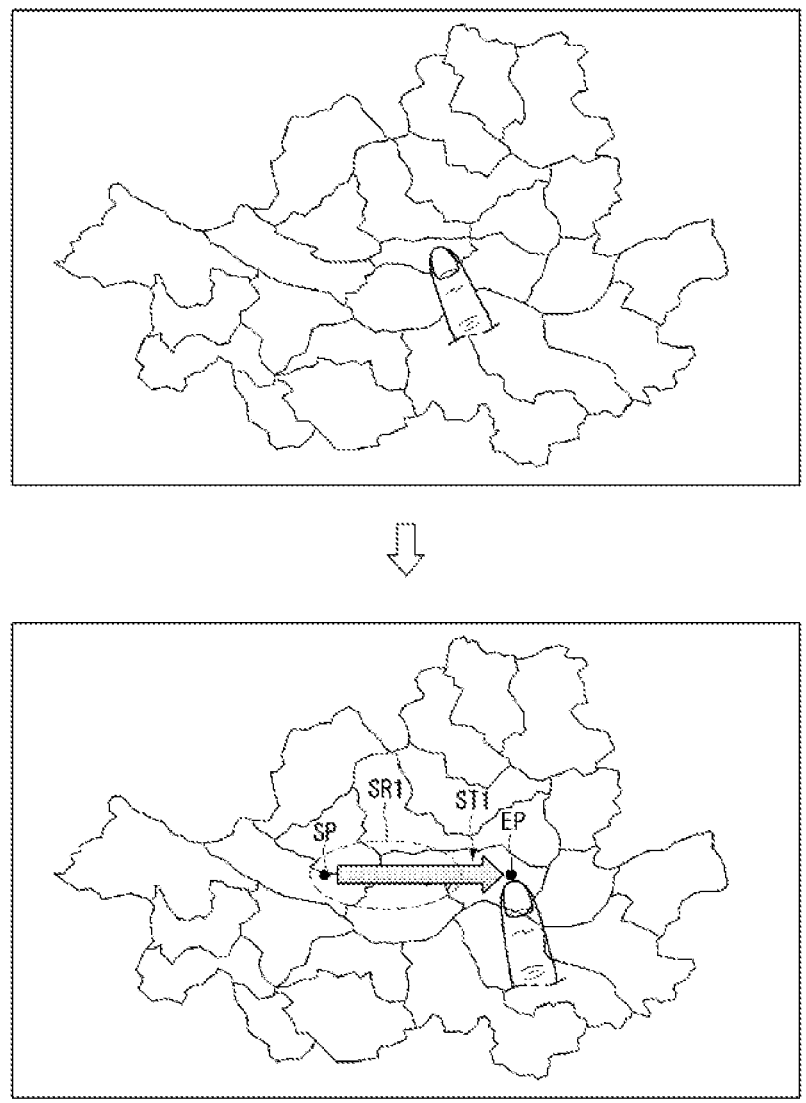
FIGS. 10 to 12 are diagrams for describing the first embodiment of the present invention.
Figure 11:
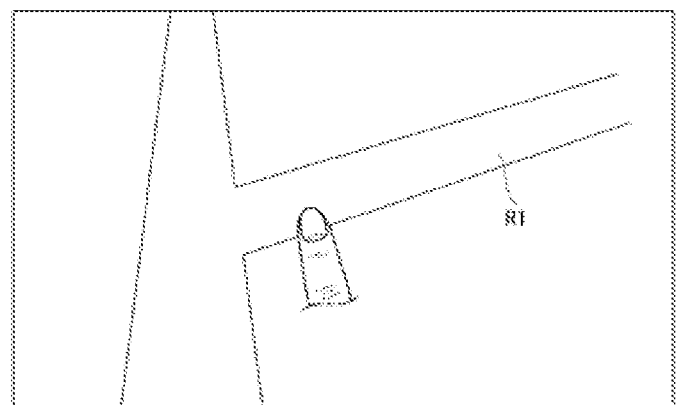
Figure 11:
Figure 11:
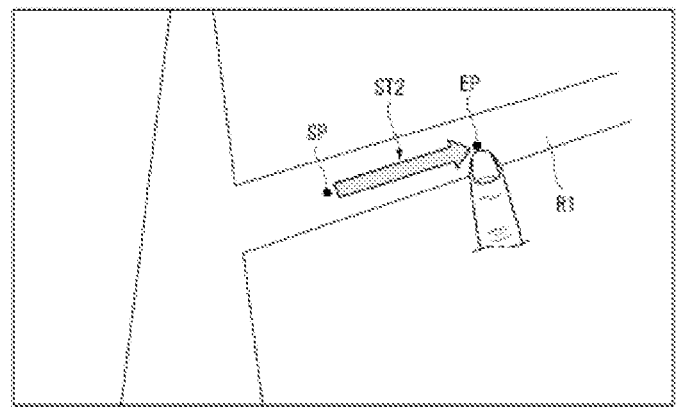
Figure 12:
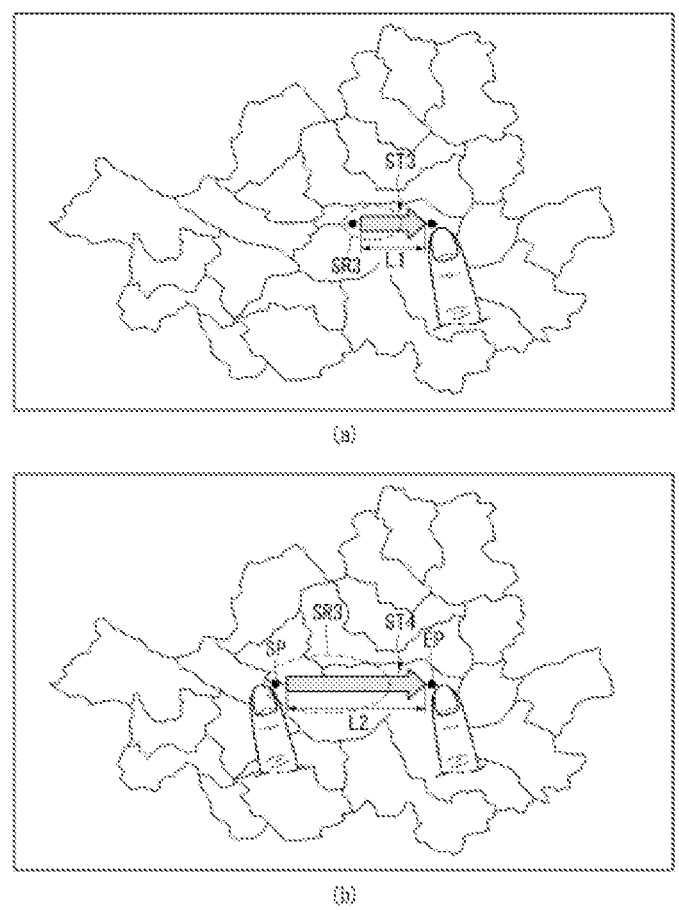

FIG. 9 is a flowchart for describing a method of receiving a configuration and information of a search condition according to a first embodiment of the present invention. FIGS. 10 to 12 are diagrams for describing the first embodiment of the present invention.

The navigations 10 and 400 receive a predetermined stroke through a user input module 121. The user input module 121 may be implemented by a touch screen or a touch pad as described above. That is, the navigations 10 and 400 may receive a stroke input by a user's touch through the touch screen or the touch pad.

The navigations 10 and 400 analyze the input stroke (S410).

The navigations 10 and 400 may analyze whether the input stroke coincides with a predetermined pattern. In other words, a form of the input stroke (a form of a trajectory) may be analyzed. For example, the navigations 10 and 400 may analyze whether the input stroke is a straight line, a curve, an opened curve, a closed curve, or the like.

The navigations 10 and 400 may analyze a direction of the input stroke. For example, the navigations 10 and 400 may analyze the direction of the input stroke based on a start point (SP) of the stroke and an end point (EP) of the stroke. Alternatively, the navigations 10 and 400 may segment the stroke into micro units while the stroke is input and thereafter, acquire direction vectors corresponding to the segmented strokes and thereafter, analyze the direction of the stroke by using the direction vectors.

The navigations 10 and 400 may analyze a length of the input stroke. For example, the navigations 10 and 400 may analyze the length of the stroke based on a straight distance from the start point (SP) to the end point (EP) of the stroke. Alternatively, the navigations 10 and 400 may segment the stroke into micro units and thereafter, calculate lengths corresponding to the segmented strokes, and thereafter, add all of the lengths of the segmented strokes to analyze an actual length of the stroke.

The navigations 10 and 400 may analyze a speed of the input stroke. For example, the navigations 10 and 400 may analyze the speed of the stroke based on a time required from an input start time of the stroke and an input end time of the stroke.

That is, the navigations 10 and 400 may analyze attributes corresponding to the stroke.

According to an analysis result, the navigations 10 and 300 may configure a search condition which matches the analysis result.

FIGS. 10 to 12 are diagrams for describing a method of configuring a search condition depending on an event according to the first embodiment of the present invention.

According to the embodiment of the present invention, the navigations 10 and 400 may set an input of a stroke having a predetermined pattern as a predetermined event. As a result, when the input of the stroke having the predetermined pattern occurs (when the predetermined event occurs), the stroke may be analyzed as described above.

Referring to FIGS. 10 to 12, a user inputs strokes (ST1 of FIG. 10, ST2 of FIG. 11, ST3 of FIG. 12(a), and ST4 of FIG. 12(b)) through a touch input on map data displayed on a touch screen of the navigations 10 and 400.

The strokes ST1, ST2, ST3, and ST4 have start points (SP) and end points (EP).

In this case, according to the embodiment of the present invention, the navigations 10 and 400 may set the search location and the search range as the search condition based on the start point (SP) of the stroke ST1 and the direction of the stroke ST1. Furthermore, the navigations 10 and 400 may set the search direction as the search condition based on the direction of the stroke ST1. The embodiment may be applied in a case in which accumulation of the map data displayed on the touch screen of the navigations 10 and 400 is comparatively small. That is, the embodiment may be applied in a case in which the map data displayed on the touch screen is displayed by the unit of a city or by the unit of a town.

For example, referring to FIG. 10, the navigations 10 and 400 may set a search range SR1 in a direction which the stroke ST1 faces around a location corresponding to the start point SP of the stroke ST1. In this case, a direction corresponding to the direction of the stroke ST1 is set as the search direction to configure the search condition.

For example, in a case where it is proposed a case in which 'Yangjaedong' as a specific region is set as the search location, when the direction of the stroke ST1 faces 'Seochodong' or when the end point EP is positioned in the Seochodong, the search direction may be set as 'to Yangjaedong-Seochodong'. In this case, when the server 200 receives the search condition configured as described above, traffic related information corresponding to a direction from the Yangjaedong to the Seochodong is selected from traffic related information corresponding to roads connecting Yangjaedong and Seochodong to be transmitted to the navigations 10 and 400.

Meanwhile, according to the embodiment of the present invention, the navigations 10 and 400 may set the search condition by using a specific road corresponding to the start point SP as the search location based on the start point SP of the stroke ST2 and set, based on a direction of the stroke ST2, a search direction corresponding to the direction of the stroke ST2 as the search condition. The embodiment may be applied to a case in which accumulation of the map data displayed on the touch screen of the navigations 10 and 400 is comparatively large. That is, the embodiment may be applied in a case in which a road is enlarged enough to distinguish the road on the map data displayed on the touch screen.

For example, FIG. 11 illustrates a case in which a specific road R is positioned at a location of the start point SP of the stroke ST2. In this case, the navigations 10 and 400 set a specific road R corresponding to the start point SP of the stroke ST1 and sets the direction corresponding to the direction of the stroke ST2 as the search direction to configure the search condition.

For example, in a case where it is proposed a case in which the start point SP corresponds to 'Gangnamdaero', when the direction of the stroke ST2 faces 'Gangnam Station', the search direction may be set as 'to Yangjae Station-Gangnam Station'.

Meanwhile, according to the embodiment of the present invention, the navigations 10 and 400 may determine the size of the search range based on the length of the stroke.

For example, referring to FIG. 12, it can be seen that a length L1 of a stroke ST3 illustrated in (a) is smaller than a length L2 of a stroke ST4 illustrated in (b). In this case, the navigations 10 and 400 may set the search range by considering the lengths of the strokes ST3 and ST4. For example, as illustrated in FIG. 12, when the length L3 of the stroke ST3 is small, a search range SR2 corresponding thereto may be smaller than a search range SR3 corresponding to the stroke ST4 having the larger length.

Meanwhile, although not illustrated in the figure, the search range may be determined by considering the speed of the stroke. For example, when the speed of the stroke is higher and higher, the search range may be more extended.

As such, it has been described that a user inputs one stroke through the touch screen to allow the navigations 10 and 400 to generate the search condition corresponding to the stroke. Hereinafter, a second embodiment for generating the search condition when the number of strokes is two will be described.

The navigations 10 and 400 transmit the configured search condition to the server 200 as described above (S430).

Subsequently, the navigations 10 and 400 may receive information corresponding to the search condition (S440). It has been described in detail above that the server 200 receives the search condition from the navigations 10 and 400 and transmits information corresponding to the received search condition to the navigations 10 and 400, but a detailed description thereof will be omitted.

As described above, according to the first embodiment of the present invention, the search condition may be configured based on the stroke input and information corresponding thereto may be received. As a result, the user may more easily and intuitively configure the search condition.

Second Embodiment

According to a second embodiment of the present invention, when a plurality of predetermined strokes is input, the navigations 10 and 400 may generate a search condition corresponding to the plurality of strokes. Hereinafter, referring to FIGS. 13 to 21, the second embodiment of the present invention will be described.

Figure 13:
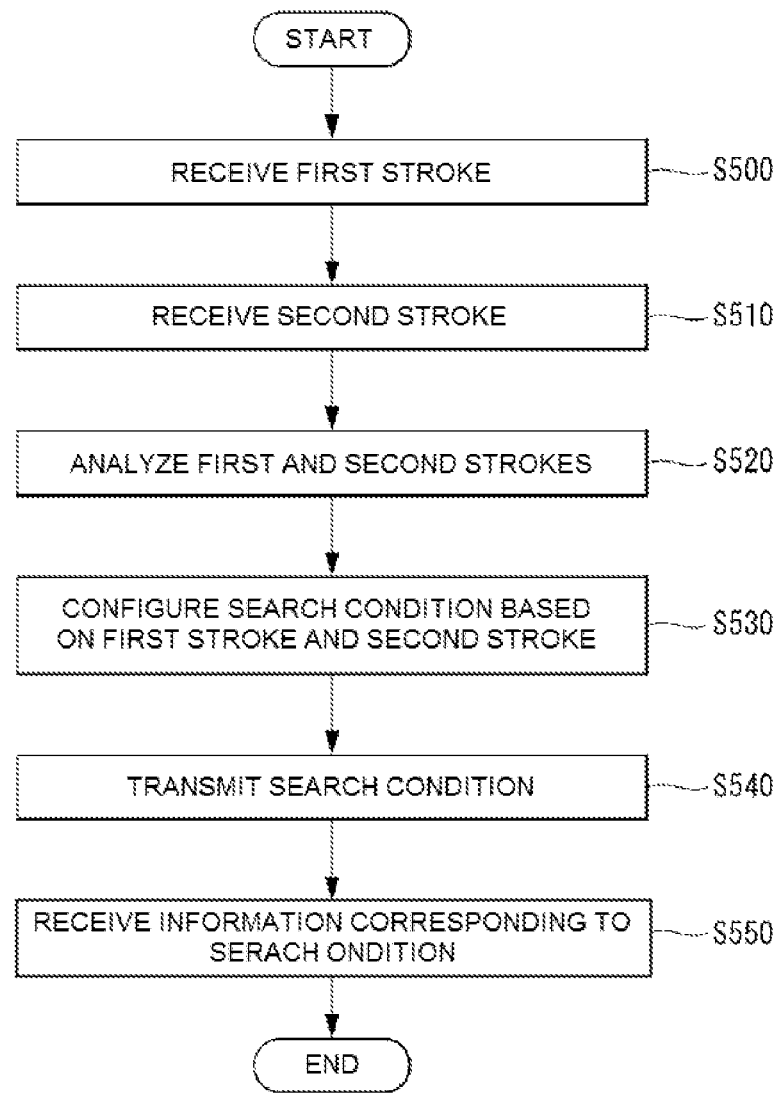
FIG. 13 is a flowchart for describing a method of receiving a configuration and information of a search condition according to a second embodiment of the present invention.

FIG. 13 is a flowchart for describing a method of receiving a configuration and information of a search condition according to a second embodiment of the present invention. FIGS. 14 to 21 are diagrams for describing the second embodiment of the present invention.

The navigations 10 and 400 analyze a first stroke through the touch screen (S400).

Subsequently, the navigations 10 and 400 may receive a second stroke through the touch screen (S410). In this case, since the navigations 10 and 400 may receive the second stroke or may not receive the second stroke after receiving the first stroke, the navigations 10 and 400 may stand by inputting the second stroke during a predetermined time after receiving the first stroke. When the second stroke is not input during the predetermined time, a step of generating the search condition according to the first stroke may be entered according to the first embodiment.

The navigations 10 and 400 analyze the first stroke and the second stroke. A method of analyzing the first stroke and the second stroke may be similarly as the method of analyzing the stroke in the first embodiment. That is, the navigations 10 and 400 may analyze attributes such as forms, directions, lengths, speeds, and the like of the first and second strokes.

The navigations 10 and 400 may configure the search condition based on the first and second strokes (S430).

A method of determining the search location, the search direction, and the search range configuring the search condition may be much diversified based on the first and second strokes. Hereinafter, the method of configuring the search condition according to the second embodiment of the present invention will be described with reference to FIGS. 14 to 21.

Figure 14:
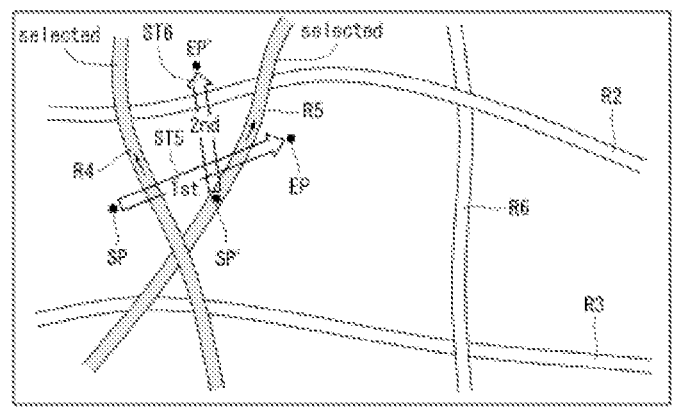
FIGS. 14 to 21 are diagrams for describing the second embodiment of the present invention.

Referring to FIG. 14, a first road R2, a second road R3, a third road R4, a fourth road R5, and a fifth road R6 are illustrated. Meanwhile, a first stroke ST5 crosses the third road R4 and the fourth road R5 among the plurality of roads R2, R3, R4, R5, and R6, but does not cross the remaining roads R2, R3, and R6. That is, it can be seen that the first stroke ST5 crosses on the third road R4 and the fourth road R5. In this case, the navigations 10 and 400 may determine the search location as the third road R4 and the fourth road R5 by the first stroke ST5. That is, the third road R4 and the fourth road R5 may be selected as the search location.

Meanwhile, it can be seen that the second stroke ST6 is input from the bottom to the top shown in the figure and the navigations 10 and 400 may configure the search direction condition by the second stroke ST6.

For example, information (for example, traffic related information) according to the embodiments of the present invention is mapped to direction information to be stored in the server 200 as described above and the navigations 10 and 400 may generate a search condition for the direction information corresponding to the information by the second stroke ST6. As illustrated in FIG. 14, when the second stroke ST6 is input, the search direction may be an upward direction of each of the third road R4 and the fourth road R5.

Figure 15:
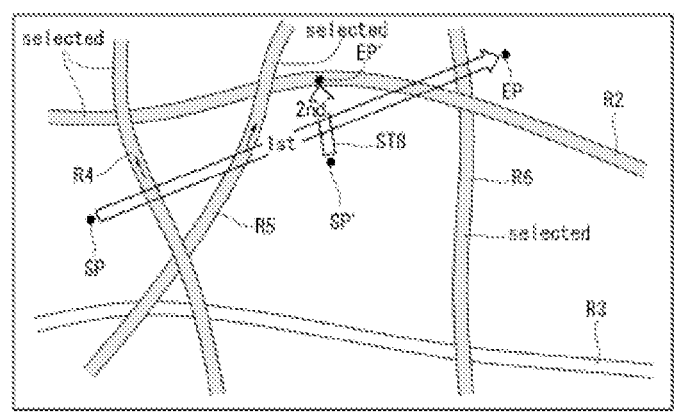

Referring to FIG. 15, it can be seen that a first stroke ST7 crosses the third road R4, the fourth road R5, and the fifth road R6. In this case, the navigations 10 and 400 may select the first road R2, the third road R4, the fourth road R5, and the fifth road R6 that cross the first stroke ST7 as the search location (that is, a search road). Meanwhile, a search direction by a second stroke ST8 may be determined as the upward direction as described above.

Figure 16:
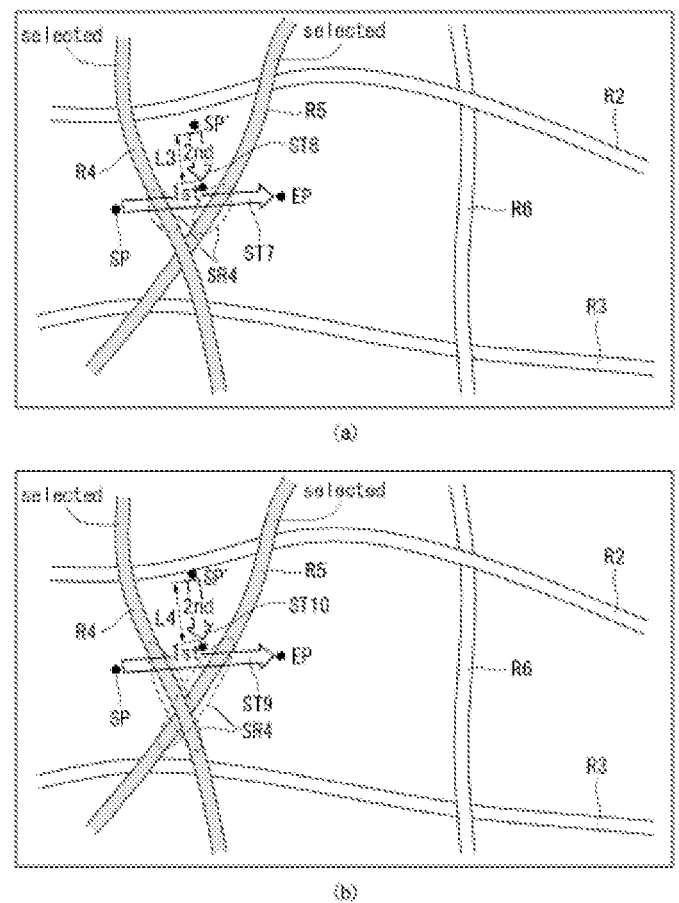

Referring to FIG. 16, it is described that the search range may be set differently according to an attribute of the second stroke.

Referring to FIGS. 16(*a*) and 16(*b*), the third road R4 and the fourth road R5 are selected by the first strokes ST7 and ST9 as described above. Meanwhile, FIGS. 16(*a*) and 16(*b*) illustrate the second strokes ST8 and ST10 having the different lengths L3 and L4, respectively are input. In this case, the navigations 10 and 400 may determine search ranges SR4 and SR5 by considering the lengths of the second strokes ST8 and ST10.

That is, as illustrated, it can be seen that the search range SR5 when the second stroke ST10 having the relatively larger length L4 is input is broader than the search range SR4 when the second stroke ST8 having the relatively smaller length L3 is input.

Meanwhile, the navigations 10 and 400 need to determine the start point of the search range at the time of setting the search range and the start point of the search range may be selected as points where the first strokes ST7 and ST9 and the roads R4 and R5 cross each other. Alternatively, when the roads R4 and R5 are divided into a plurality of specific sections, a start point of a section including cross points of the first strokes ST7 and ST9 and the roads R4 and R5 may be selected as the start point of the search range.

Figure 17:
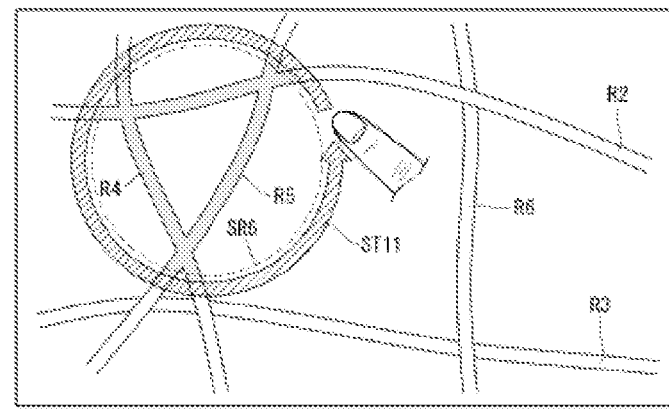
Figure 18:
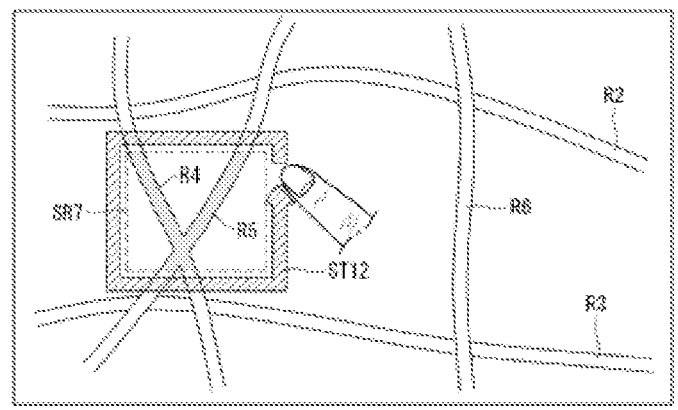

In FIGS. 17 and 18, first strokes ST11 and ST12 that draw the closed curve are input. That is, the first strokes ST11 and ST12 in which the start point and the end point coincide with each other are illustrated in FIGS. 17 and 18.

In this case, the navigations 10 and 400 may select the roads R2, R3, R4, and R5 that cross the first strokes ST11 and ST12.

Meanwhile, the navigations 10 and 400 select the roads R2, R3, R4, and R5 that cross the first strokes ST11 and ST12 and may select a road section included in the closed curve determined by the first strokes ST11 and ST12 as search ranges SR6 and SR7. That is, the navigations 10 and 400 may set the inside of the closed curve determined by the first strokes ST11 and ST12.

The second stroke is not illustrated in FIGS. 17 and 18, but as described above with reference to FIGS. 13 to 16, even when the closed curve is input as the first stroke, the second stroke may be input and the search direction may be set by the second stroke. It will be described with reference to FIGS. 19 to 21.

Figure 19:
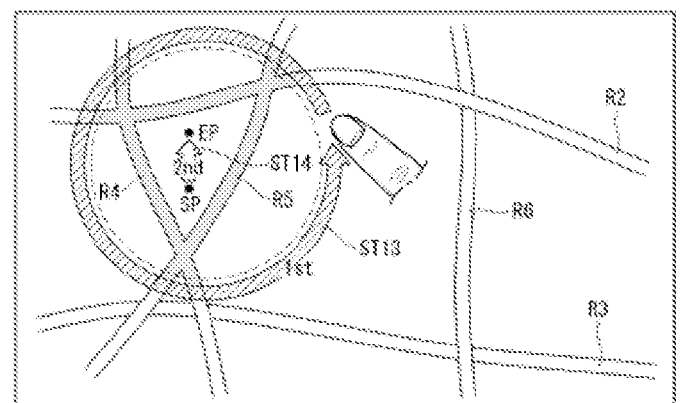

Referring to FIG. 19, a first stroke ST13 is input as a circular closed curve and a second stroke ST14 is input in the circular closed curve. As illustrated in FIG. 19, when the first stroke ST13 and the second stroke ST14 are input, the navigations 10 and 400 may determine a search location (for example, a search road) and a search range based on the first stroke ST13 similarly as the method described with reference to FIGS. 17 and 18. Furthermore, the navigations 10 and 400 may set the search direction based on the second stroke ST14.

As one example, the second stroke ST14 is input in the circular closed curve formed by the first stroke ST13 in FIG. 19, but the second stroke ST14 may cross the first stroke ST13 or be positioned outside the closed curve.

However, the following search condition may be generated when the first stroke ST13 and the second stroke ST14 cross each other, and as a result, a start point and an end point of the second stroke ST14 are inside and outside the closed curve, respectively. Hereinafter, an embodiment in which the search condition is generated when the first stroke ST13 that forms the closed curve and the second stroke ST14 will be described with reference to FIGS. 20 and 21.

Figure 20:
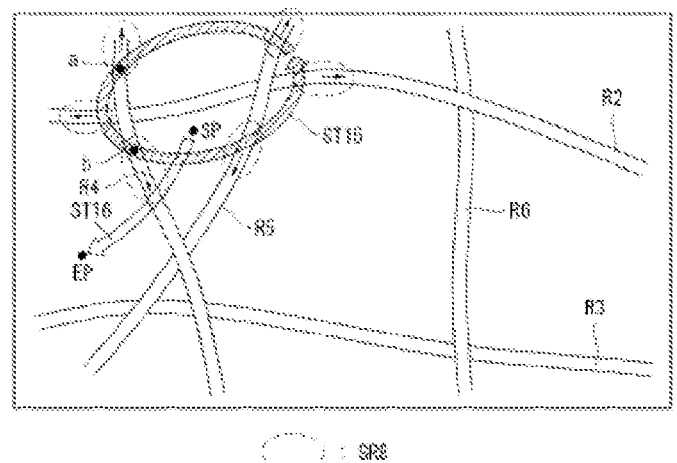

In FIG. 20, a first stroke ST15 is input, which forms an oval closed curve is input and a second stroke ST16 is input, which has a start point SP positioned inside the closed curve and an end point EP positioned outside the closed curve.

In this case, the navigations 10 and 400 may select a road that crosses the first stroke ST15 forming the closed curve and set a search direction as a direction from the inside to the outside of the closed curve formed by the first stroke ST15.

For example, the third road R4 crosses the closed curve at two points a and b, and a search direction based on each point may be set to an upward direction of the third road R4, which is a direction that faces the outside of the closed curve in the third road R4 at the point a and to a downward direction of the third road R4, which is a direction that faces the outside of the closed curve in the third road R4 at the point b. As a result, a search range SR8 based on the point a and a search range SR8 based on the point b may be respectively formed.

As illustrated in FIG. 20, the search direction and/or the search range SR8 may be set with respect to even the first road R2 and the fourth R5 which are the roads crossing the closed curve in addition to the third road R4 in a method similar to the method described above.

Figure 21:
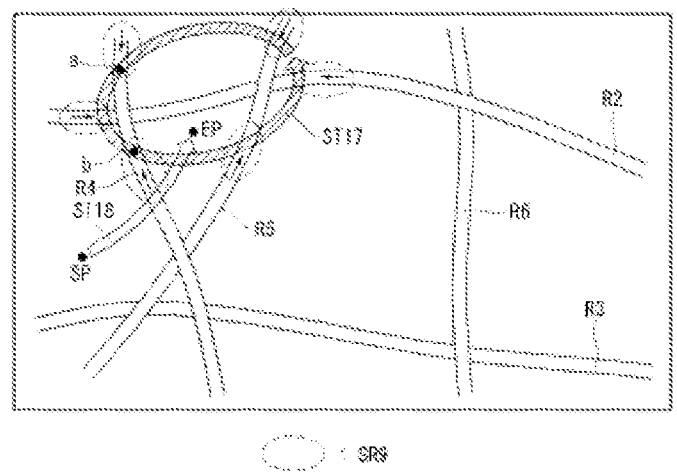

Meanwhile, in FIG. 21, a first stroke ST17 is input, which forms an oval closed curve is input and a second stroke ST18 is input, which has a start point SP positioned outside the closed curve and an end point EP positioned inside the closed curve.

In this case, the navigations 10 and 400 may select a road that crosses the first stroke ST17 forming the closed curve and set a search direction as a direction from the outside to the inside of the closed curve formed by the first stroke ST17.

For example, the third road R4 crosses the closed curve at two points c and d, and a search direction based on each point may be set to a downward direction of the third road R4, which is a direction that faces the inside of the closed curve in the third road R4 at the point c and to an upward direction of the third road R4, which is a direction that faces the inside of the closed curve in the third road R4 at the point d. As a result, search ranges SR9 based on the respective points c and d may be respectively formed. It is apparent that the search direction and the search range SR9 may be set even with respect to the first road R2 and the fourth road R5 that crosses the first stroke ST17 in a similar method.

As such, the method of configuring the search condition according to the second embodiment of the present invention has been described with reference to FIGS. 14 to 21.

Referring back to FIG. 13, the navigations 10 and 400 may transmit the search condition configured as described above to the server 200 (S440) and receive information (for example, traffic related information) corresponding to the search condition (S450). A detailed description thereof will be omitted.

As described above, according to the second embodiment of the present invention, the search condition may be configured based on a plurality of stroke inputs and information corresponding thereto may be received. As a result, the user may more easily and intuitively configure the search condition.

Third Embodiment

According to a third embodiment of the present invention, the navigations 10 and 400 may provide a user input screen for configuring a search condition and configure the search condition based on a content input through the user input screen. Hereinafter, referring to FIGS. 22 to 27, the third embodiment of the present invention will be described.

Figure 22:
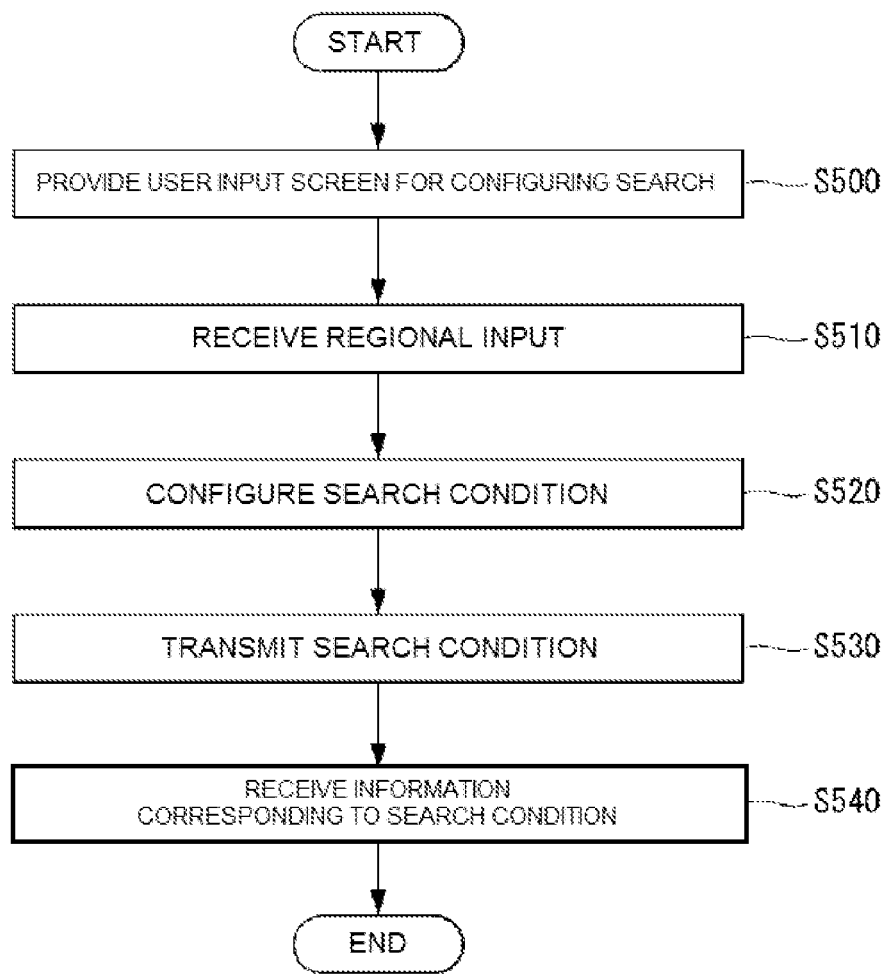
FIG. 22 is a flowchart for describing a method of receiving a configuration and information of a search condition according to a third embodiment of the present invention.

FIG. 22 is a flowchart for describing a method of receiving a configuration and information of a search condition according to a third embodiment of the present invention. FIGS. 23 to 27 are diagrams for describing the third embodiment of the present invention.

When the navigations 10 and 400 receive a request from the user, the navigations 10 and 400 may provide a user input screen for configuring a search condition (S500).

Subsequently, the navigations 10 and 400 may receive an input for configuring the search condition from the user (S510) and configure the search condition based on a user's input (S520).

Figure 23:
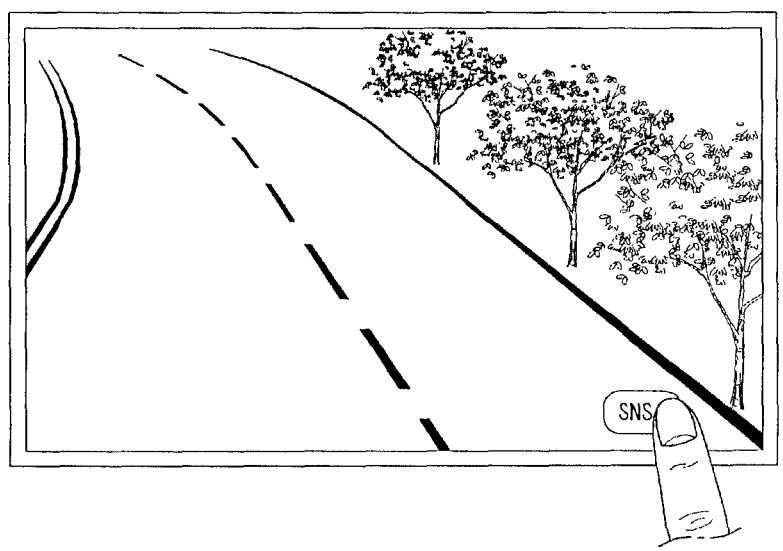
FIGS. 23 to 27 are diagrams for describing the third embodiment of the present invention.

The navigations 10 and 400 may receive the request in various methods. For example, the navigations 10 and 400 may provide a specific function key SNS as illustrated in FIG. 23 and the user touches the corresponding function key to request configuring the search condition.

The navigations 10 and 400 may provide various user input screens. Examples of various user input screens are illustrated in FIGS. 24 to 27.

Figure 24:
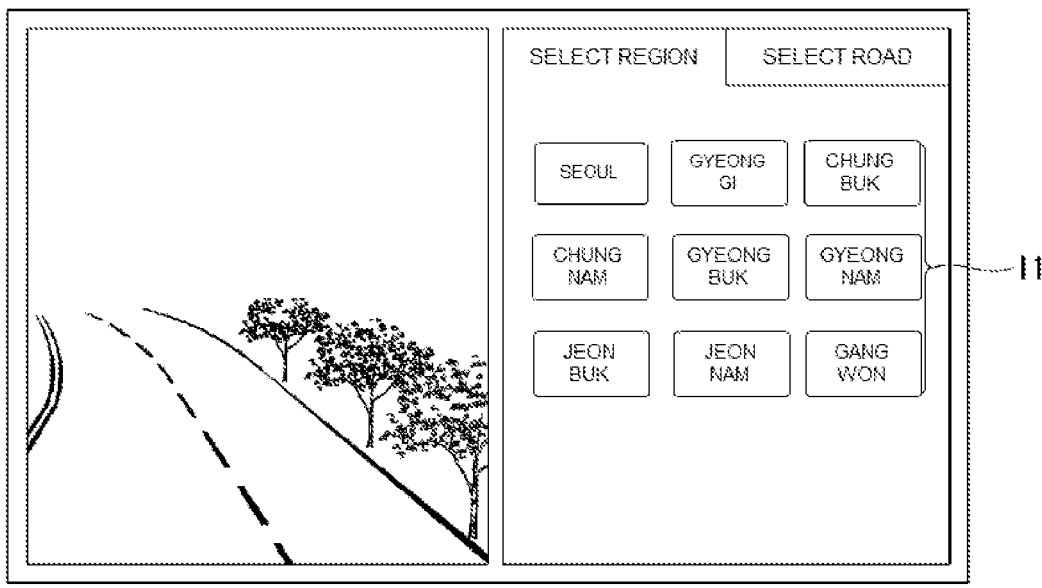

Referring to FIG. 24, the navigations 10 and 400 may provide a plurality of items I1 for selecting a search region.

The user may input information for configuring the search condition through the user input screen illustrated in FIG. 24. For example, when the user selects an item displayed as 'Seoul', the navigations 10 and 400 may be search condition as 'Seoul'.

Meanwhile, when the user selects the item displayed as 'Seoul', items corresponding to lower administrative districts included in Seoul. For example, lower regions corresponding to 'Gangnamgu', Gangdonggu', 'Gangseogu', 'Songpagu', and the like may be further displayed. The user may select at least one of the lower items and the navigations 10 and 400 may configure regions corresponding to the item selected by the user as the search condition. It is apparent that another lower items for the lower items may be further provided.

Figure 25:
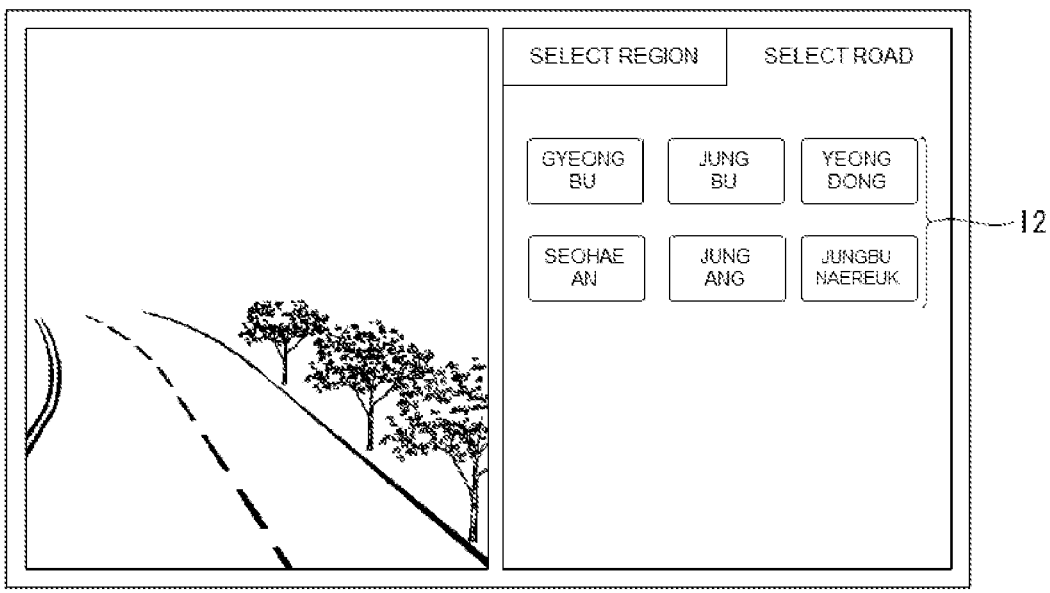

Referring to FIG. 25, a plurality of items 12 corresponding to a specific road may be displayed on the user input screen instead of a region name. The user may select at least one of the plurality of items illustrated in FIG. 25 and the navigations 10 and 400 may configure a search condition including a road corresponding to the item selected by the user. For example, when the user selects an item displayed as 'Gyeongbu', the navigations 10 and 400 may configure a search condition for receiving information corresponding to Gyeongbu Expressway.

Meanwhile, when the user selects the item displayed as 'Gyeongbu', items corresponding to lower sections of Gyeongbu Expressway may be further displayed. For example, items corresponding to the lower sections of Gyeongbu Expressway, such as 'Suwon IC-Giheung IC', 'Giheung IC'-Dongtan IC', and the like may be further displayed. The user may select at least one of the lower items and the navigations 10 and 400 may configure a search condition including a road or a road section corresponding to the item selected by the user. In this case, directions may correspond to the lower items. For example, an item corresponding to 'Suwon IC-Giheung IC' and an item corresponding to 'Giheung IC-Suwon IC' may be separately provided. In this case, the navigations 10 and 400 may configure a search condition including the directions corresponding to the items.

The method in which the navigations 10 and 400 provide the item for configuring the search condition through the user input screen may be diversified in addition to the aforementioned method. For example, the navigations 10 and 400 may display a plurality of items corresponding to a specific road and lower sections of the specific road to the user.

Figure 26:
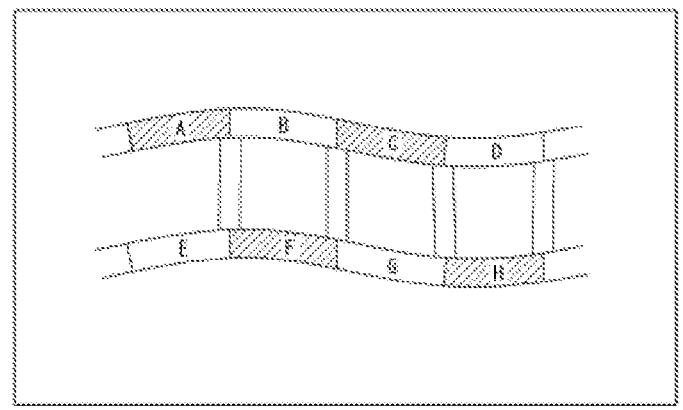

FIG. 26 illustrates a case in which a plurality of items A, B, C, D, E, F, G, and H corresponding to riverside roads of Seoul and lower sections of the respective riverside roads are provided on the user input screen. The user may select at least one of the items A, B, C, D, E, F, G, and H corresponding to the respective sections of the riverside roads and the navigations 10 and 400 may configure a search condition including a section corresponding to the selected item. In this case, the navigations 10 and 400 may provide a user interface for further selecting a search direction for the selected item.

Figure 27:
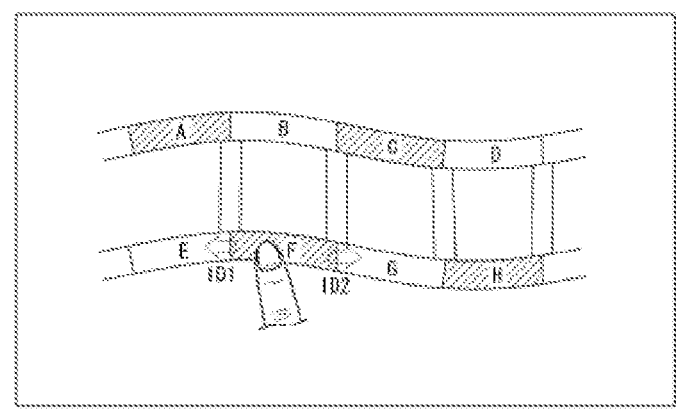

For example, referring to FIG. 27, when the user selects a specific item F, the navigations 10 and 400 may display indicators ID1 and ID2 for selecting a direction at left and right sides of the selected specific item F. When the user selects one of the indicators ID1 and ID2, the navigations 10 and 400 may configure a search condition including a direction corresponding to an indicator selected by the user. The method in which the navigations 10 and 400 provide the indicator and the method in which the user selects one of the indicators ID1 and ID2 may be diversified. For example, the navigations 10 and 400 may display the indicators ID1 and ID2 on the user input screen while the user keeps touching the specific item F. In this case, the user multi-touches one indicator to select the indicator. Alternatively, when the indicators ID1 and ID2 are displayed, the user inputs a stroke toward an indirection to be selected from the specific item F to select the corresponding indicator. For example, when the indicators ID1 and ID2 are displayed while the user keeps touching the specific item F, the user may flick one indicator from the specific item F and an indicator positioned in a flicking direction may be selected.

As described above, through various user input screens and user inputs input through the user input screens, the navigations 10 and 400 may configure various search conditions corresponding to the user inputs.

Continuously, referring to FIG. 22, the navigations 10 and 400 may transmit the search condition configured as described above to the server 200 (S530) and receive information (for example, traffic related information) corresponding to the search condition (S540). A detailed description thereof will be omitted.

As described above, according to the third embodiment of the present invention, the navigations 10 and 400 provides the user input screen for configuring the search condition by a request from the user, and as a result, the user may perform an input for more easily and intuitively configuring the search condition.

Fourth Embodiment

According to a fourth embodiment of the present invention, the navigations 10 and 400 may generate, according to movement speeds of the navigations 10 and 400, search conditions corresponding to the movement speeds. Hereinafter, referring to FIGS. 28 to 30, the fourth embodiment of the present invention will be described.

Figure 28:
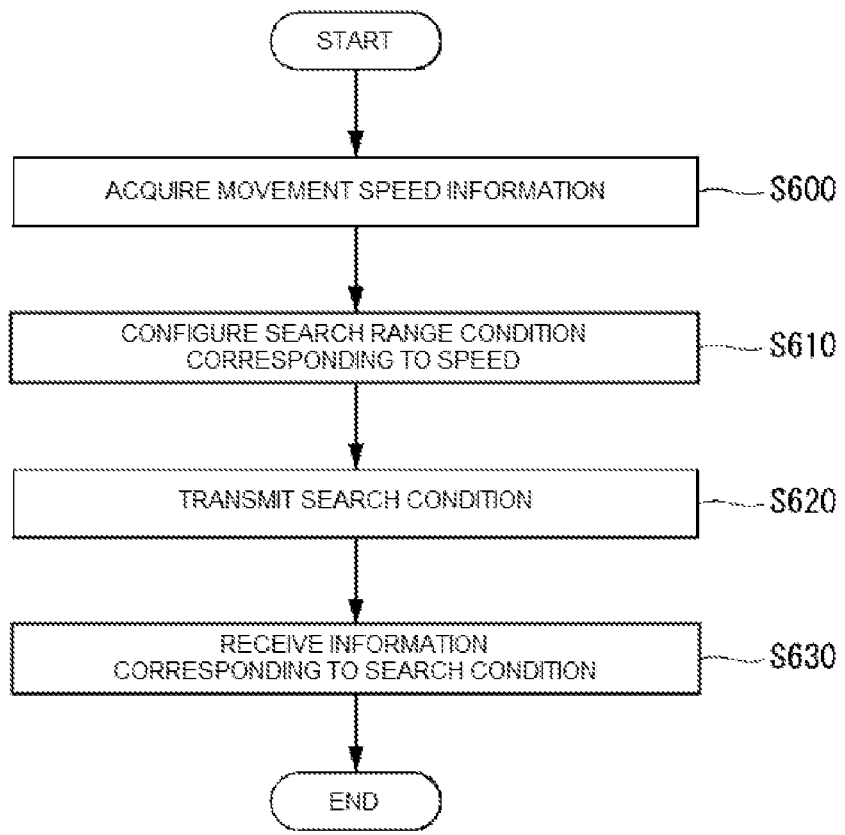
FIG. 28 is a flowchart for describing a method of receiving a configuration and information of a search condition according to a fourth embodiment of the present invention.
Figure 29:
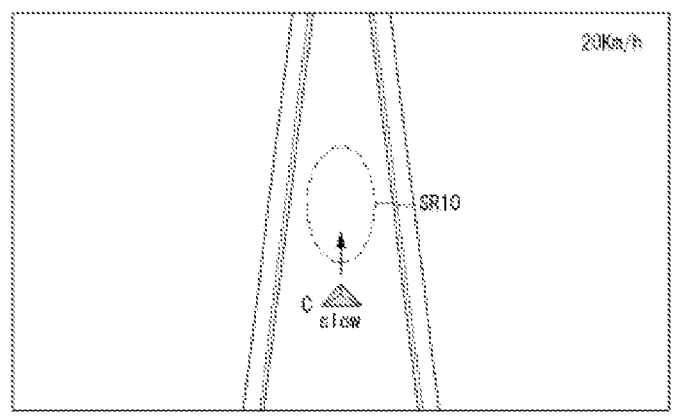
FIGS. 29 and 30 are diagrams for describing the fourth embodiment of the present invention.
Figure 30:
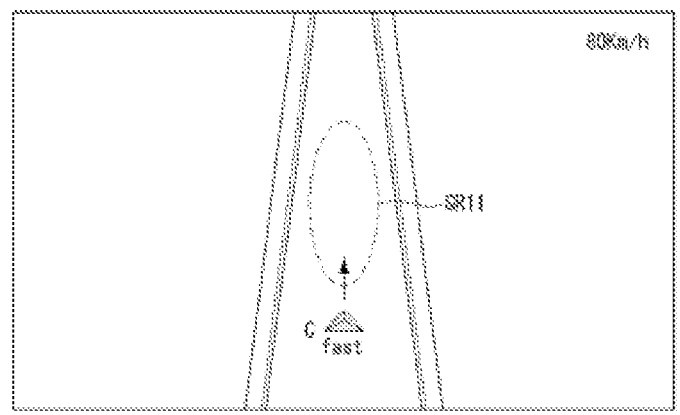

FIG. 28 is a flowchart for describing a method of receiving a configuration and information of a search condition according to a fourth embodiment of the present invention. FIGS. 29 and 30 are diagrams for describing the fourth embodiment of the present invention.

The navigations 10 and 400 may acquire movement speed information (S600). For example, the navigations 10 and 400 may acquire present movement speeds. The navigations 10 and 400 may receive a GPS signal through a location data module 111 and acquire the movement speeds by using variations depending on a longitude coordinate and a latitude coordinate calculated based on the received GPS signal. Alternatively, the navigations 10 and 400 receive movement speed information of a vehicle from an engine control unit (ECU) of a vehicle attached or mounted with the navigations 10 and 400 to acquire the movement speed information.

The navigations 10 and 400 may configure a search range corresponding to the acquired movement speed as a search condition. That is, when the acquired movement speed is changed, the navigations 10 and 400 may configure a search range corresponding to the changed movement speed differently.

For example, referring to FIGS. 29 and 30, search ranges SR10 and SR11 set depending on the movement speeds of the navigations 10 and 400 are different from each other. That is, it can be seen that the size of the search range SR10 set when the navigations 10 and 400 move relatively slowly (for example, move at a speed of 20 km/h) as illustrated in FIG. 29 may be smaller than the size of the search range SR11 set when the navigations 10 and 400 move relatively fast (for example, move at a speed of 80 km/h) as illustrated in FIG. 30.

In this case, the navigations 10 and 400 may configure a present driving road as a search location based on present locations of the navigations 10 and 400. Further, the navigations 10 and 400 may configure directions in which the navigations 10 and 400 move at present to be included in the search condition as the search direction. That is, the navigations 10 and 400 may configure the present driving road by the search condition as the search location without an additional user input and configure a present moving direction by the search condition as the search direction. Of course, the navigations 10 and 400 need not particularly set the search location and/or search direction based on a present location and a present movement direction and the search location and/or the search direction may be set by another method.

Subsequently, the navigations 10 and 400 may transmit the search condition configured as described above to the server 200 (S620) and receive information (for example, traffic related information) corresponding to the search condition (S630). A detailed description thereof will be omitted.

As described above, according to the fourth embodiment of the present invention, the navigations 10 and 400 may automatically configure the search condition based on the movement speed, the movement direction, and/or the present location of the navigations 10 and 400 or the vehicles mounted with the navigations 10 and 400. As a result, the user may more easily access various information (for example, the traffic related information) through a terminal such as the navigations 10 and 400.

The methods according to the respective embodiments of the present invention may be used individually or combinationally. Further, steps constituting each embodiment may be used individually from or combinationally with steps constituting other embodiments.

In the present invention, various substitutions, modifications, and changes can be made within the scope without departing from the spirit of the present invention by those skilled in the art, and as a result, the present invention is not limited to the aforementioned embodiments and the accompanying drawings. Further, the embodiments described in the document may be not limitatively applied, but all or some of the respective embodiments may be selectively combined so as to achieve various modifications.

The invention claimed is:

1. An electronic apparatus, comprising:
   a first communication unit for communicating with a second communication unit to receive data from a navigation database containing traffic information;
   a display unit for displaying first navigation information;
   an input unit for receiving an input of a stroke on the first navigation information from a user; and
   a control unit transmitting, through the first communication unit to the second communication unit, a search condition for navigation data based at least in part on a start point location of the stroke and an end point location of the stroke on the displayed first navigation information, receiving the specific navigation data corresponding to the search condition, and displaying second navigation information on the display unit based on the received navigation data,
   wherein the control unit configures the search condition of the navigation data to include at least one of search direction, search range, and search region, and
   wherein the control unit sets, when the input stroke includes a first stroke and a second stroke, sets the search region by considering the first stroke and sets at least one of the search direction and the search range by considering the second stroke.

2. The electronic apparatus of claim 1, wherein the search condition is further based on acquiring a movement speed of the electronic apparatus.

3. The electronic apparatus of claim 2, wherein the search condition can also be based on at least one of a shape of the stroke, a direction of the stroke, a length of the stroke, and a speed of the stroke on the displayed first navigation information.

4. The electronic apparatus of claim 3, wherein the control unit sets the search range based on at least one of the length of the stroke and the speed of the stroke.

5. The electronic apparatus of claim 3, wherein the control unit sets the search direction corresponding to the direction of the stroke by considering the direction of the stroke.

6. The electronic apparatus of claim 3, wherein the control unit sets, when the stroke is a closed curve, the search range corresponding to the inside of the closed curve.

7. The electronic apparatus of claim 1, wherein the control unit sets a road displayed in the first navigation information crossing the first stroke as the search region.

8. The electronic apparatus of claim 2, wherein the control unit provides a user input screen displaying first navigation information for setting the search condition when there is a request from a user.

9. The electronic apparatus of claim 8, wherein the control unit displays at least one item corresponding to a specific search region on the user input screen.

10. The electronic apparatus of claim 9, wherein the control unit further displays at least one indicator indicating a direction when the item is selected.

11. The electronic apparatus of claim 10, wherein the control unit selects the item based on a start point of the stroke, selects the indicator based on the direction of the an end point of the stroke, and sets the search region and the search direction by considering the selected item and the selected indicator.

12. The electronic apparatus of claim 2, wherein the control unit sets a search range of the navigation data depending on the movement speed when acquiring the movement speed.

13. A method of receiving traffic information of an electronic apparatus, comprising:

displaying first navigation information on a display unit;
receiving a stroke of a user on the first navigation information from input unit over the display unit;
determining a search condition for data based at least in part on a start point location of the stroke and an end point location of the stroke on the displayed first navigation information with a controller unit, wherein the search condition is further based on acquiring a movement speed of the electronic apparatus such that the search condition is configured to include a search range of the navigation data depending on the movement speed when the movement speed is acquired;
transmitting, through a first communication unit to a second communication unit, the search condition;
receiving navigation data from a navigation database containing traffic information, through the first communication unit from the second communication unit, corresponding to the search condition; and
displaying second navigation information on the display unit based on the received navigation data.

14. The method of receiving traffic information of an electronic apparatus of claim 13, wherein the control unit configures the search condition of the navigation data to include at least one of search direction, search range, and search region.

15. The method of receiving traffic information of an electronic apparatus of claim 14, wherein the search condition can also be based on at least one of a shape of the stroke, a direction of the stroke, a length of the stroke, and a speed of the stroke on the displayed first navigation information.

16. The method of receiving traffic information of an electronic apparatus of claim 13, further comprising: providing a user input screen on the display unit for setting the search condition when there is a request from a user.

17. A recording medium having a program for performing a method of claim 13 therein.

* * * * *